(12) United States Patent
Cha et al.

(10) Patent No.: US 10,425,718 B2
(45) Date of Patent: Sep. 24, 2019

(54) ELECTRONIC DEVICE, STORAGE MEDIUM, AND METHOD OF PROCESSING AUDIO SIGNAL BY ELECTRONIC DEVICE

(71) Applicant: Samsung Electronics Co., Ltd., Gyeonggi-do (KR)

(72) Inventors: A-Ran Cha, Gyeonggi-do (KR); Byeong-Jun Kim, Gyeonggi-do (KR); Jae-Hyun Kim, Gyeonggi-do (KR); Nam-Il Lee, Gyeonggi-do (KR); Hyun Jo, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/838,726

(22) Filed: Dec. 12, 2017

(65) Prior Publication Data

US 2018/0167718 A1 Jun. 14, 2018

(30) Foreign Application Priority Data

Dec. 13, 2016 (KR) .......................... 10-2016-0169664

(51) Int. Cl.
*A61F 11/00* (2006.01)
*H04R 1/10* (2006.01)
(Continued)

(52) U.S. Cl.
CPC ........... *H04R 1/1083* (2013.01); *G06F 3/165* (2013.01); *G10H 1/46* (2013.01); *G10K 11/175* (2013.01);
(Continued)

(58) Field of Classification Search
CPC ....... H04R 1/10; H04R 1/1008; H04R 1/1016; H04R 1/1041; H04R 1/08; H04R 1/1083;
(Continued)

(56) References Cited

U.S. PATENT DOCUMENTS

| 6,603,863 B1 | 8/2003 | Nagayoshi |
| 8,750,527 B2 | 6/2014 | Tiscareno et al. |

(Continued)

FOREIGN PATENT DOCUMENTS

| EP | 3 089 475 A1 | 11/2016 |
| KR | 2008-177629 A | 7/2008 |

(Continued)

OTHER PUBLICATIONS

International Search Report Dated Mar. 19, 2018.

*Primary Examiner* — Leshui Zhang
(74) *Attorney, Agent, or Firm* — Cha & Reiter, LLC.

(57) ABSTRACT

Disclosed are an electronic device and a method of processing an audio signal by the electronic device. The electronic device includes: a processor functionally connected to a speaker and a microphone; and a memory electrically connected to the processor. The memory includes instructions to cause the processor, when executed, to output a first audio signal through the speaker; identify that a second audio signal detected by the microphone corresponds to the first audio signal when the first audio signal is outputted through the speaker; and control output of the first audio signal based on the identification. Further, various other embodiments may be possible.

26 Claims, 16 Drawing Sheets

(51) Int. Cl.

| | | |
|---|---|---|
| *G10K 11/178* | (2006.01) | |
| *G10H 1/46* | (2006.01) | |
| *G10K 11/175* | (2006.01) | |
| *G06F 3/16* | (2006.01) | |
| *G06F 3/0488* | (2013.01) | |

(52) U.S. Cl.
CPC ..... *G10K 11/17881* (2018.01); *H04R 1/1041* (2013.01); *G06F 3/0488* (2013.01); *G10K 2210/1081* (2013.01); *G10K 2210/3213* (2013.01); *H04R 1/1016* (2013.01); *H04R 2430/01* (2013.01)

(58) Field of Classification Search
CPC ........ H04R 1/1091; H04R 1/105; H04R 5/00; H04R 5/033; H04R 5/04; H04R 27/00; H04R 27/02; H04R 27/04; H04R 2227/01; H04R 2227/003; H04R 2420/01; H04R 2420/03; H04R 2420/05; H04R 2420/07; H04R 2420/09; H04R 2430/00; H04R 2430/01; H04R 2430/03; H04R 2430/20; H04R 2430/23; G10K 11/175; G10K 11/178; G10K 11/17833; G10K 11/17835; G10K 11/17837; G10K 11/1785; G10K 11/1783; G10K 11/17827; G10K 11/16; G05B 21/02; G06F 3/16; G06F 3/162; G06F 3/165; G06F 3/167

USPC ... 381/19–23, 309, 310, 311, 26, 28, 56–60, 381/61, 63, 312–321, 71.1, 71.6, 71.8, 381/71.11, 71.12, 71.13, 71.14, 72, 73.1, 381/74, 79, 80, 81, 82, 83, 85, 332, 334, 381/91, 92, 93, 94.1–94.9, 95, 100, 101, 381/102, 103, 104–115, 118, 119, 120, 381/121, 122, 123; 700/94

See application file for complete search history.

(56) References Cited

U.S. PATENT DOCUMENTS

| | | | |
|---|---|---|---|
| 2008/0170725 A1 | 7/2008 | Asada et al. | |
| 2009/0010444 A1* | 1/2009 | Goldstein | H03G 3/342 |
| | | | 381/66 |
| 2010/0119077 A1 | 5/2010 | Platz et al. | |
| 2013/0170656 A1* | 7/2013 | Tiscareno | H04R 1/1016 |
| | | | 381/57 |
| 2017/0171657 A1* | 6/2017 | Liu | H04R 3/04 |

FOREIGN PATENT DOCUMENTS

| | | | | |
|---|---|---|---|---|
| KR | 10-1595964 B1 | 2/2016 | | |
| KR | 10-2016-0138726 A | 12/2016 | | |
| WO | 2008/138349 A2 | 11/2008 | | |
| WO | WO-2008138349 A2 * | 11/2008 | ........... | G10K 11/178 |
| WO | WO-2016107207 A1 * | 7/2016 | ............... | H04R 3/04 |

\* cited by examiner

000# ELECTRONIC DEVICE, STORAGE MEDIUM, AND METHOD OF PROCESSING AUDIO SIGNAL BY ELECTRONIC DEVICE

CLAIM OF PRIORITY

This application claims priority under 35 U.S.C. § 119(a) to Korean Application Serial No. 10-2016-0169664, which was filed in the Korean Intellectual Property Office on Dec. 13, 2016, the entire content of which is hereby incorporated by reference.

TECHNICAL FIELD

The present disclosure relates to an electronic device, a storage medium, and a method of processing an audio signal by the electronic device.

BACKGROUND

In general, earphones that include one or more miniaturized speaker units may be worn in or around a user's ears. The earphones may work in conjunction with an electronic device to output audio signals to the user's ears. Because the earphones are inside or close to the user's ears, the user may listen to the audio signals even when little power is provided to the earphones.

SUMMARY

General open-type earphones (e.g. headphones) may fit differently on different users' ears depending on the various shapes of the ears. Further open-type earphones (e.g. headphones) may not block ambient noise. In-ear earphones, such as those where a part of the earphones is inserted inside the user's ears, may have ear tips made of an elastic material. Thus, in-ear earphones may be in closer contact with the users' ear canal and may function to block out external ambient noise. However, to properly block out noise and to provide the best sound quality, the ear tips have to properly seal against the inside of the user's ears. But because shapes of the users' ears vary, a mass-produced ear tip having the same shape may not properly seal against all ear shapes.

The present disclosure provides an electronic device where when the audio signal is output through earphones, the electronic device may identify external noise and sounds that leak through a gap between the ear tip and the user's ears. The identification may be accomplished using another audio signal input into a microphone of the earphones.

An electronic device and a method of processing an audio signal by the electronic device according to various embodiments of the present disclosure may control the output of the audio signal through the earphones based on volumes of the identified external noise and the leaked sound. Accordingly, one advantage presented in the present disclosure is the automatic output control of the audio signal based on the external noise and the leaked sound.

In accordance with an aspect of the present disclosure, an electronic device is provided. The electronic device includes: a processor functionally connected to a speaker and a microphone; and a memory electrically connected to the processor. The memory includes instructions to cause the processor, when executed, to output a first audio signal through the speaker; identify that a second audio signal detected by the microphone corresponds to the first audio signal when the first audio signal is outputted through the speaker; and control output of the first audio signal based on the identification.

In accordance with another aspect of the present disclosure, a method of processing an audio signal by an electronic device is provided. The method includes: outputting a first audio signal through a speaker functionally connected to the electronic device; identifying that a second audio signal detected by a microphone functionally connected to the electronic device corresponds to the first audio signal when the first audio signal is outputted through the speaker; and controlling output of the first audio signal based on the identification.

In accordance with another aspect of the present disclosure, an electronic device is provided. The electronic device includes: a speaker located at a first position of the electronic device; a microphone located at a second position of the electronic device; and a processor configured to output a first audio signal through the speaker; identify that a second audio signal detected by the microphone corresponds to the first audio signal when the first audio signal is outputted through the speaker; and control output of the first audio signal based on the identification.

In accordance with another aspect of the present disclosure, a storage medium of an electronic device storing instructions that, when executed by at least one processor, cause the at least one processor to perform operations is provided. The operations includes: outputting a first audio signal through a speaker functionally connected to the electronic device; identifying that a second audio signal detected by a microphone functionally connected to the electronic device corresponds to the first audio signal when the first audio signal is outputted through the speaker; identifying a third audio signal detected by the microphone that is different from the second audio signal; and controlling output of the first audio signal based on identifying the second audio signal and the third audio signal.

According to an electronic device and a method of processing an audio signal by the electronic device according to one embodiment of the present disclosure, when an audio signal is outputted through a speaker of earphones, it is possible to identify external noise and leaking sound generated by a gap between the user's ear canals and the earphones. It is also possible to control the output of the audio signal from the speaker, so that the user can listen to the audio signal where the volume of the audio signal is automatically controlled according to various situations without user intervention.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
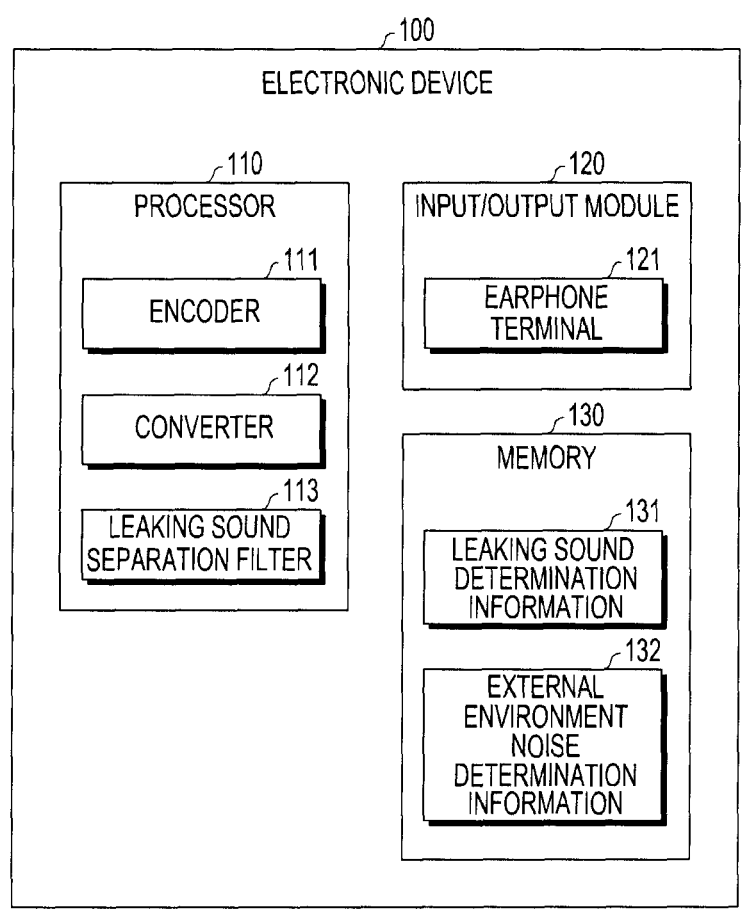
FIG. 1A and FIG. 1B are block diagrams illustrating various examples of electronic device configurations according to various embodiments of the present disclosure.

Hereinafter, various embodiments of the present disclosure will be described with reference to the accompanying drawings. The embodiments and the terms used therein are not intended to limit the technology disclosed herein to the specific disclosures, and should be understood to include various modifications, equivalents, and/or alternatives to the corresponding embodiments that are known or may be apparent to one of ordinary skill in the art. In the description of the drawings, similar reference numerals may be used to designate similar elements. As used herein, singular forms may include plural forms as well unless the context clearly indicates otherwise. The expression "a first," "a second," "the first," or "the second" used herein may specify various components regardless of the order and/or the importance of the components. Further, these expressions do not limit the corresponding components. When an element (e.g., first element) is referred to as being "(functionally or communicatively) connected" to another element (second element), the element may be connected directly to the other element or connected to the other element through yet another element (e.g., third element).

The expression "configured to" used herein may be used interchangeably used with, for example, "suitable for," "having the capacity to," "designed to," "adapted to," "made to," or "capable of" in terms of hardware or software, depending on the context of the disclosure. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a corresponding memory device.

An electronic device according to various embodiments of the present disclosure may be, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, or a wearable device. According to various embodiments, the wearable device may be an accessory (e.g., a watch, a ring, a bracelet, an anklet, a necklace, a glasses, a contact lens, or a Head-Mounted Device (HMD)), a fabric or clothing integrated device (e.g., an electronic clothing), a body-mounted device (e.g., a skin pad, or tattoo), or a bio-implantable device (e.g., an implantable circuit). In some embodiments, the electronic device may be, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, or an electronic photo frame.

In other embodiments, the electronic device may be various medical devices (e.g., various portable medical measuring devices (a blood glucose monitoring device, a heart rate monitoring device, a blood pressure measuring device, a body temperature measuring device, etc.), a Magnetic Resonance Angiography (MRA) scanner, a Magnetic Resonance Imaging (MRI) scanner, a Computed Tomography (CT) machine, or an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in stores, or internet device of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may be a part of furniture or a building/structure, an electronic board, an electronic signature receiving device, a projector, or various types of measuring instruments (e.g., a water meter, an electric meter, a gas meter, a radio wave meter, and the like). In various embodiments, the electronic device may be flexible, or may be a combination of one or more of the aforementioned various devices.

The electronic device according to one embodiment of the present disclosure is not limited to the above described devices and may be, without departing from the spirit of the disclosure, include other electronic devices and new electronic devices developed in the art. As used herein, the term "user" may indicate a person who uses the electronic device or a device (e.g., an artificial intelligence electronic device) that uses the electronic device.

Figure 1B:
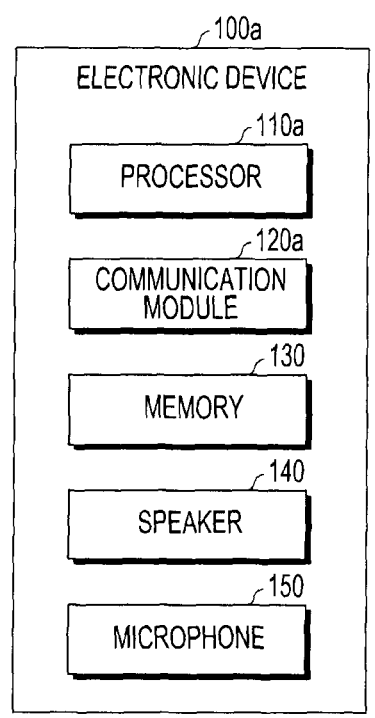

FIGS. 1A and 1B are block diagrams illustrating various examples of electronic device configurations according to various embodiments of the present disclosure.

Referring to FIG. 1A, an electronic device 100 may include a processor 110, an input/output device 120, and a memory 130.

The processor 110 may control the overall operation of the electronic device 100. For example, the processor 110 may output an audio signal through a pair of connected earphones, detect external noise and/or sound leaking from the earphones using the earphones, and control the output of the audio signal based on the detected noise and/or leaked sound.

The processor 110 may include an encoder 111, a converter 112, and a leaking sound separation filter 113.

The encoder 111 may convert detected audio signals into a signal of a format (for example, Pulse Code Modulation: PCM) that can be processed by the electronic device 100.

The converter 112 may include a Digital-Analog Converter (DAC) for converting digital audio signals into analog audio signals so that the signal can be output via the earphones. The converter 112 may also include an Analog-Digital Converter (ADC) for converting analog audio signals input into digital audio signals. The ADC may convert analog audio signals that are detected by a microphone of the earphones.

The leaking sound separation filter 113 may include a filter for isolating the sound leaking from the earphones (which may be referred to as "leaking sound" herein) from the audio signal that is detected by the microphone of the earphones. For example, the processor 110 may isolate the leaking sound from the inputted audio signal and determine that the rest of the audio signal is external noise.

According to one embodiment of the present disclosure, the processor 110 may identify the sound leaked from the earphones when the earphones are worn by the user and outputs sounds to the user's ears. For example, the earphones may include a microphone that may detect ambient sounds around the user, including the leaking sound. The detected ambient sounds may be transmitted to the processor 110. The processor 110 may then detect the leaking sound by identifying an audio signal in the ambient sounds that has frequencies similar to those of the audio signal currently outputted by the earphones.

According to one embodiment of the present disclosure, the processor 110 may change the output settings of the audio signal currently outputted by the earphones based on the characteristics of the leaking sound and the external noise. For example, parameters of the output settings may include the signal strength of the microphone, the frequency band of the audio signal, the volume of the audio signal, Noise Suppression (NS), Echo Cancellation (EC), Automatic Gain Control (AGC), application of various filters, and Dynamic Range Compression (DRC).

According to one embodiment of the present disclosure, when the volume of the identified external noise is lower than the volume of the leaking sound, the processor 110 may decrease the volume of the audio signal currently outputted by the earphones to be lower than the current volume. When the volume of external noise is higher than the volume of the leaking sound, the processor 110 may increase the volume of the audio signal currently outputted by the earphones or increase the volume in a particular frequency band, depending on the frequency characteristics of the external noise.

The input/output module 120 may include an earphone terminal 121, and the earphone terminal 121 may detect electric signals when a connection terminal of an external electronic device (for example, earphones) is inserted into the electronic device 100. For example, the processor 110 may determine whether the electronic device 100 and the earphones are connected to each other based on the electric signal detected by the earphone terminal 121. The memory 130 may store leaking sound determination information 131 and external environment noise determination information 132.

The leaking sound determination information 131 may include information for determining a reference volume and a leakage state in order to determine whether the leaking sound is included in the ambient sounds detected by the microphone. For example, when the microphone detects the outputted audio signal, and the volume of the detected audio signal exceeds the reference volume, the processor 110 may determine that the leaking sound is present.

The external environment noise determination information 132 may include information for determining external noise in the signal detected by the microphone, and may include reference volume information. The reference volume information may include a plurality of information that correspond to various locations, and the processor 110 may determine whether the noise exceeds a reference volume at a particular location when the user is at that location.

According to one embodiment of the present disclosure, the memory 130 may further store output control information of the audio signal outputted by the earphones. For example, when the output of the audio signal is controlled according to user input (or external input) when leaking sound and external noise are detected, the output control information may include information to allow the user to change the volume of the audio signal. The user input may be an input of a physical button electrically connected to the electronic device 100, a touch or gesture input, or various other types of inputs.

According to one embodiment of the present disclosure, when the audio signal is output through the earphones, the processor 110 may identify output control information stored in memory 130 that corresponds to the leaking sound and the external noise detected by the microphone of the earphones. The processor may then control the output of the audio signal according to the output control information. For example, the processor 110 may control the output of the audio signal through the earphones based on volume change information included in the output control information.

According to one embodiment of the present disclosure, the electronic device 100 may store a history of the output state of the audio signal. The electronic device 100 may then reproduce the output state when the current state of the electronic device is similar to the state corresponding to one of the output states. For example, the electronic device 100 may store the output state of the audio signal when the user is in a library, e.g. for libraries, the volume of the audio signal is below a certain threshold. The next time the user is in a library, the electronic device may control the output of the audio signal so that its volume is also below the threshold. Thus, the volume of the audio signal may be automatically controlled when the user is in an environment that is similar to a pre-store environment.

Referring to FIG. 1B, an electronic device 100a may include a processor 110a, a communication module 120a, the memory 130, the speaker 140, and the microphone 150.

According to one embodiment of the present disclosure, the electronic device 100a is an earphone device which can be worn on the user's ears and includes two bodies corresponding to the user's left and right ears. Each of the bodies may include the speaker 140 and the microphone 150.

The processor 110a may control the overall operation of the electronic device 100a. For example, the processor 110a may detect the leaking sound and external noise in ambient sounds detected by the microphone 150. The processor 110a may in turn control the volume of audio signal outputted through the speaker 140 based on the detected ambient sounds.

According to one embodiment of the present disclosure, the processor 110a may convert the ambient sounds detected by the microphone 150 into a signal of a format (for example, Pulse Code Modulation: PCM) that can be processed by the electronic device 100a. For example, the processor 110a may include a Digital-Analog Converter (DAC) for converting digital audio signals into analog audio signals so that the signal can be output through the speaker 140, and an Analog-Digital Converter (ADC) for converting analog audio signals detected by the microphone 150 into digital audio signals.

According to one embodiment of the present disclosure, the processor 110a may include a filter for separating the leaking sound from the ambient sounds detected by the microphone 150. For example, the processor 110a may isolate the leaking sound and identify the rest of the ambient sounds as external noise.

According to one embodiment of the present disclosure, the processor 110a may identify the leaking sound by identifying an audio signal in the ambient sounds detected by the microphone 150 that has frequencies similar to those of the audio signal currently outputted by the speaker 140.

According to one embodiment of the present disclosure, the processor 110a may change the output settings of the audio signal outputted through the speaker 140 based on the characteristics of the leaking sound and the external noise.

According to one embodiment of the present disclosure, when the volume of the identified external noise is lower than the volume of the leaking sound, the processor 110a may decrease the volume of the audio signal outputted by the speaker 140 so that it is lower than the current volume. When the volume of the external noise is higher than the volume of the leaking sound, the processor 110a may increase the volume of the audio signal outputted by the speaker 140 or increase the volume in a particular frequency band according to the frequency characteristics of the external noise. As such, the processor 110a may control the output settings of the audio signal outputted through the speaker 140 based on the characteristics of the leaking sound and the external noise.

The communication module 120a may allow the electronic device 100a to connect to the electronic device 100 through short-range wireless communication (for example, Bluetooth), and may transmit the audio signals detected by the microphone 150 to the electronic device 100 and receive control signals and audio data from the electronic device 100. For example, as the ambient sounds detected by the microphone 150 is transmitted, the control signal received may include information for controlling the volume of the audio signal outputted by the speaker 140. Alternatively, the electronic device 100a may communicate with the electronic device 100 via a wired connection.

The memory 130 may store information for controlling the volume of the audio signal outputted through the speaker 140 based on the detected leaking sound and ambient noise. For example, the information may include information to decrease or increase the volume of the output audio signal depending on the volume of the leaking sound and the noise.

The speaker 140 may include two speakers, corresponding to the user's two ears, and the microphone 150, which may include one or more microphones. For example, when the user wears the electronic device 100a, the speaker 140 may be at a first position inside of the user's ear and the microphone 150 may be at a second position may outside of the user's ears.

Figure 2A:
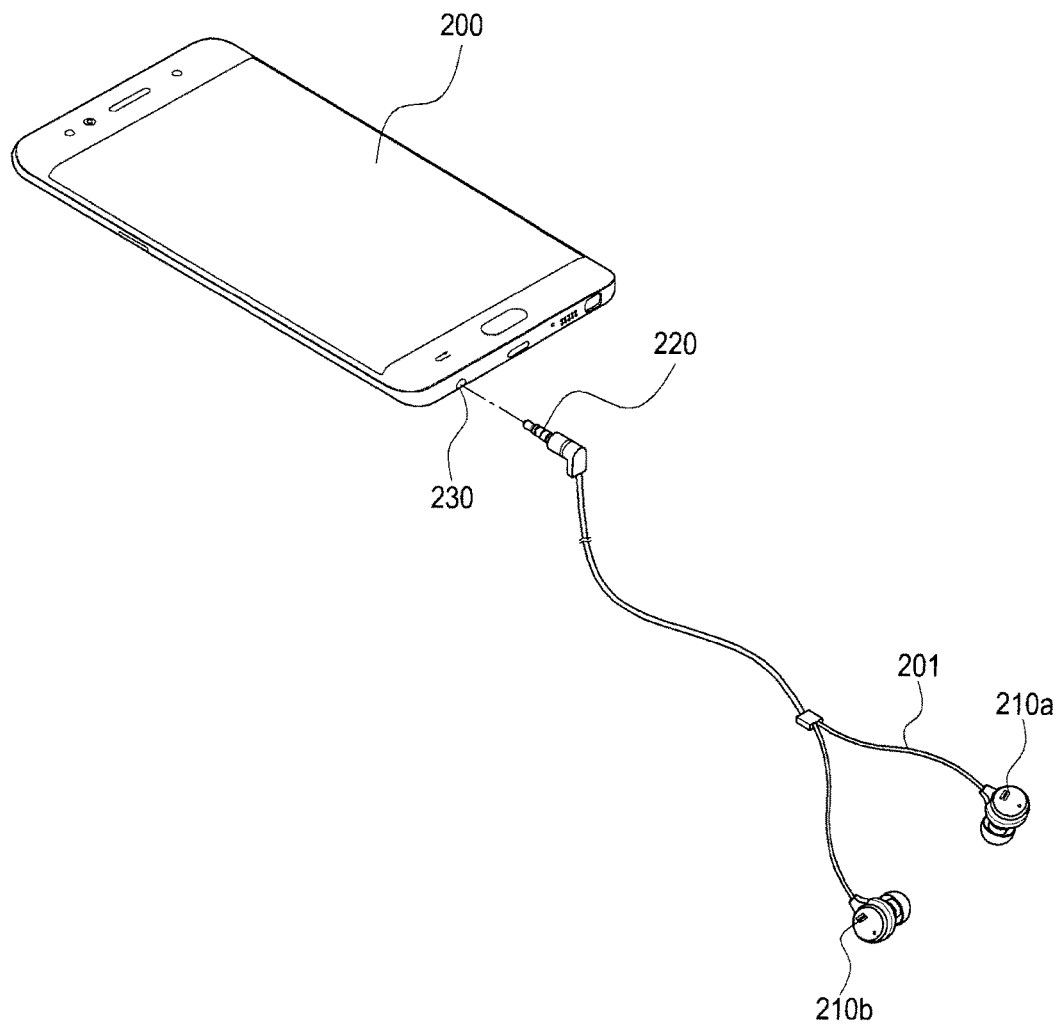
FIG. 2A and FIG. 2B are perspective views illustrating the electronic device and various examples of earphones connected to the electronic device according to various embodiments of the present disclosure.
Figure 2B:
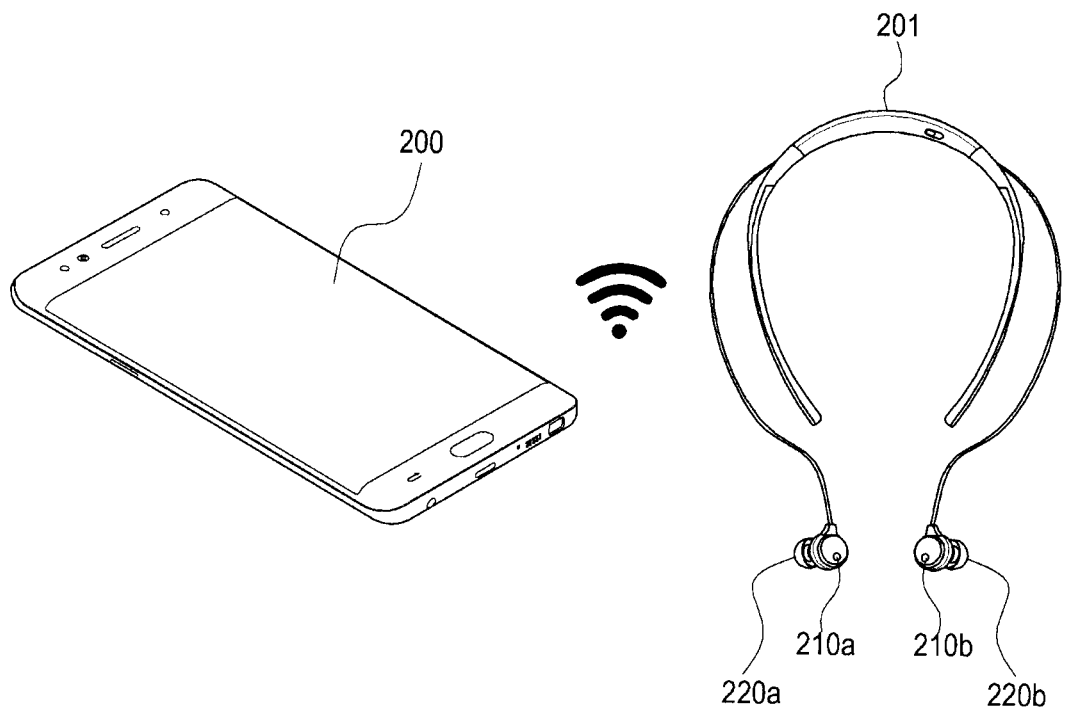

FIGS. 2A and 2B are perspective view illustrating the electronic device and various examples of earphones connected to the electronic device according to one embodiment of the present disclosure.

Referring to FIG. 2A, the electronic device 200 may include a connection member 230 for receiving the connection terminal 220 of the earphones 201. The connection member 230 may be implemented as an interface for connecting the electronic device 200 and the earphones 201, such as an earjack for connecting the earphones 201.

According to one embodiment of the present disclosure, although the connection member is disclosed herein to be an earjack, it is not so limited. For example, alternatively, the connection member may be one of various available connection members, such as a power plug, an interface connector such as a USB terminal (for example, USB C type), an HDMI terminal, a charging terminal, a socket into which storage media may be inserted, an antenna socket with which removable antennas may be inserted, etc.

According to one embodiment of the present disclosure, the earphones 201 may include at least one microphone (for example, 210a or 210b) connected to the connection terminal 220. When the connection terminal 220 is inserted into the connection member 230, an electrical signal may be generated such that the electronic device 200 may determine that the earphones are connected to the electronic device 200.

According to one embodiment of the present disclosure, the earphones 201 may include two bodies corresponding to the user's right and left ears. When the user wears the earphones 201, in each of the bodies, the speaker may be located at the first position inside the user's ear, and the microphone (for example, 210a or 210b) may be located at the second position outside the user's ear adjacent to the speakers. In another example, the earphones 201 may only include one microphone disposed in the left or right body.

According to one embodiment of the present disclosure, the earphones 201 may transmit signals detected by the microphone 210a or 210b to the electronic device 200 through the connection member 230. For example, the electronic device 200 may determine whether there are a leaking sound leaked to the outside of the user's ears and external noise outside the user's ears based on the signal detected by the microphone 210a or 210b. The electronic device 200 may then control the volume of the audio signal outputted through the earphones 201 based on the leaking sound and the external noise.

Referring to FIG. 2B, instead of employ wired communication requiring the connection member 230 and the connection terminal 220, the earphones 201 may include a communication device (for example, the communication module 120a) for wireless communication with the electronic device 200.

According to various embodiments of the present disclosure, the earphones 201 may include at least one microphone (for example, 210a or 210b) adjacent to each speaker (for example, 220a or 220b) to be placed in each of the user's ears. To connect, when the electronic device 200 detects a connection signal transmitted from the earphones 201, the electronic device 200 may determine that the earphones 201 are located within range of the electronic device 200 such that communication is possible. The electronic device 200 may then initiate a communication connection with the earphones 201.

According to one embodiment of the present disclosure, the earphones 201 may include two bodies corresponding respectively to the user's right and left ears. When the user wears the earphones 201, the speaker 220a or 220b may be located at the first position inside the user's ear, and the microphone 210a or 210b may be located at the second position outside the user's ear.

According to one embodiment of the present disclosure, the earphones 201 may wirelessly transmit signals detected by the microphone 210a or 210b to the electronic device 200. The electronic device 200 may determine whether there are a leaking sound leaked to the outside of the user's ears and external noise based on the signal detected by the microphone 210a or 210b.

According to one embodiment of the present disclosure, the electronic device 200 may transmit, to the earphones 201, control signals for controlling the volume of the audio signal outputted through the speaker 220a or 220b based on the leaking sound and the external noise. In turn, the earphones 201 may set the volume of the outputted audio signal according to the control signal.

Although it has been described that the earphones 201 transmit the signal detected by the microphone 210a or 210b to the electronic device 200 and the electronic device 200 distinguishes the leaking sound from the external noise, other embodiments are possible. For example, the processor included in the earphones 201 may distinguish the leaking sound from the external noise and set the volume of the audio signal outputted through the speaker 220a or 220b.

Figure 3:
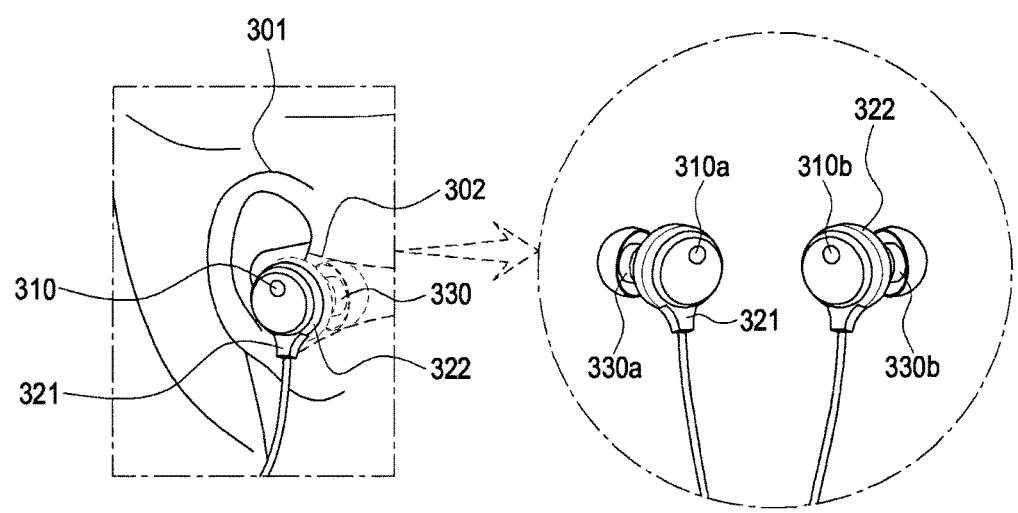
FIG. 3 is a view illustrating earphones according to one embodiment of the present disclosure.

FIG. 3 is a view illustrating earphones according to one embodiment of the present disclosure.

Referring to FIG. 3, earphones 300 may include two bodies corresponding to the right and left ears, and each of the bodies may include a housing, a microphone unit 310, and a speaker unit.

The housing may include a front housing 322 and a rear housing 321. For example, the front housing 322 may accommodate at least a part of the speaker unit and provide a resonance space of the speaker unit. The rear housing 321 may be combined with the front housing 322 to accommodate the microphone unit 310.

The microphone unit 310 may include a right microphone 310a and a left microphone 310b, corresponding to the right and left ears, respectively.

According to one embodiment of the present disclosure, when the earphones 300 are in-ear-type earphones, the earphones 300 may further include ear tips 330a and 330b. For example, the ear tip 330a and 330b may include elastomer parts, and may be fixed to the outer circumference surfaces of sound nozzles included in the front housing 322. The elastomer part may thus provide the user with a comfortable fit.

According to one embodiment of the present disclosure, the sound nozzle may be made of a rigid material, and may be inserted into the ear canal 302 of user's ear 301. The ear tip 330a or 330b may adhere to the inner wall of the ear canal 302. Because the ear tip 330a or 330b include elastomer, the ear tip 330a or 330b may be flexibly deformed to fit the ear canal 302, and may provide the user with a comfortable fit and substantially prevent the external noise from flowing into the inside of the ear 301 or the audio signal outputted through the speaker unit from leaking to the outside of the ear 301.

But because the seal by the ear tip 330a or 330b is not perfect, audio signal outputted through the speaker unit may leak to the outside of the ear 301. When this occurs, the leaking sound may be detected by the microphone unit 310 and be transmitted to the electronic device. In turn, the electronic device may control the volume of the audio signal outputted through the earphones 300 based on the volume of the leaking sound.

Figure 4:
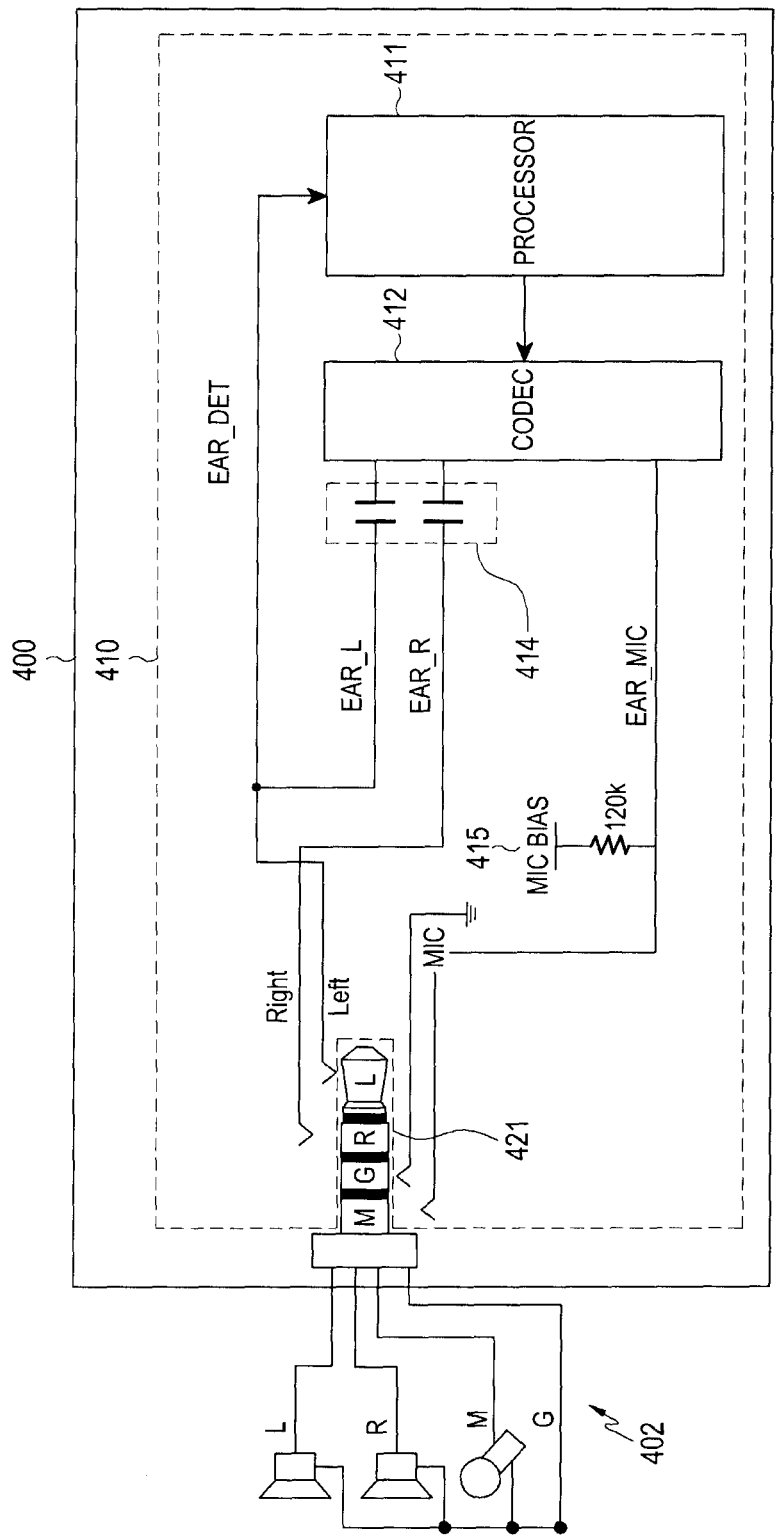
FIG. 4 is a circuit diagram of the electronic device that controls the output of an audio signal based on another audio signal inputted through the earphones according to one embodiment of the present disclosure.

FIG. 4 is a circuit diagram of the electronic device that controls the output of an audio signal based on another audio signal inputted through the earphones according to one embodiment of the present disclosure.

Referring to FIG. 4, an electronic device 400 may include a microphone input signal detection circuit unit 410, and the microphone input signal detection circuit unit 410 may include a processor 411, a codec 412, a DC-blocking capacitor 414, a microphone bias 415, and an earjack 421, into which a plug of earphones 402 is inserted.

The earjack 421 includes a microphone (MIC) terminal, a ground (G) terminal, a right earphone speaker (Right) terminal, and a left earphone speaker (Left) terminal, and each of the terminals may be electrically connected to a microphone (M) terminal, a ground (G) terminal, a right earphone speaker (R) terminal, and a left earphone speaker (L) terminal included in the plug of the earphones 402.

The microphone input signal detection circuit unit 410 may transmit an insertion signal or a separation signal of the earphones 402 to the processor 411 by detecting resistance values when the earphones 402 are attached to and detached from the earjack 421.

When the earphones 402 are inserted into the earjack 421, a first voltage (e.g. a high voltage) corresponding to the separation signal of the earphones 402 may be changed to a second voltage (e.g. low voltage) due to a change in the resistance value of the components. The second voltage corresponds to an insertion signal, and the microphone input signal detection circuit unit 410 may transmit the insertion signal corresponding to the second voltage to the processor 411. Conversely, when the earphones 402 are removed from the earjack 421, the second voltage may be changed to the first voltage, and the corresponding separation signal of the earphones 402 may be transmitted to the processor 411. Using the separation signal and the insertion signal, the processor 411 may determine whether the earphones 402 are plugged into or removed from the electronic device.

According to one embodiment of the present disclosure, when the insertion signal (low signal) of the earphones 402 is received from the microphone input signal detection circuit unit 410, the processor 411 may control to transmit an audio signal outputted from the codec 412 to the earphone speakers (L and R) of the earphones 402 and transmit an audio signal (EAR MIC) received from the earphone microphone (M) of the earphones 402 to the codec 412. Based on the received audio signal (EAR MIC), the volume of the audio signal outputted through the earphone speakers (L and R) may be controlled.

According to one embodiment of the present disclosure, the structure of the plug of the earphones 402 may include a ground (or grounding (GND)) terminal, a microphone (MIC) terminal, and first and second sound terminals. For example, the first and second sound terminals may be a right (R) sound terminal and a left (L) sound terminal, respectively. Each of the ground terminal, the microphone (MIC) terminal, and the first and second sound terminals may be conductive, and they may be sequentially formed from the tip to the sleeve of the plug, and have insulation sheaths electrically partitioning connection terminals therebetween.

The microphone terminal may transmit the ambient sounds and other audio signals detected by the microphone of the earphones to the electronic device 400, and the right sound terminal and the left sound terminal may transmit audio signals to the earphones to be output.

According to one embodiment of the present disclosure, the earphones 402 may include a plurality of microphones (for example, a first microphone and a second microphone), and may transmit ambient sounds and other audio signals detected by the plurality of microphones to the electronic device 400 through the microphone terminal. As such, based on the ambient sounds detected by the plurality of microphones, the earphones 402 may control the volumes of the audio signals outputted through the left earphone speaker (L) and the right earphone speaker (R).

According to one embodiment of the present disclosure, the user may insert the left earphone speaker (L) into his left ear but not insert the right earphone speaker (R) into his right ear. In this instance, based on the volume of the leaking sound detected by the right microphone, the processor 411 may identify that the right earphone speaker (R) is not inserted and may adjust the volume of the right earphone speaker (R) to be higher than the volume of the left earphone speaker (L). Accordingly, the user may perceive the same volume at both left and right ears, even when the right earphone speaker (R), unlike the left earphone speaker (L), is not inserted in its corresponding ear.

The codec 412 may transmit the audio signal to the left earphone speaker (L) and the right earphone speaker (R) through the plug of the earphones 402 inserted into the earjack 421 under the control of the processor 411. When the audio signal is output through the speakers, the codec 412 may further receive another audio signal corresponding to the audio signal detected by the earphone microphone (M) included in the earphones 402. For example, the other audio signal detected by the earphone microphone (M) may include a leaked partial signal from the audio signal outputted through the speaker or external noise.

The DC-blocking capacitors 414 blocks DC voltage transmitted to the codec 412.

The microphone bias 415 may be turned on or off according to the control of the processor 411, so that power supply to the earjack 421 may be blocked. For example, when the separation signal (high signal) of the earphones 402 is received from the microphone input signal detection circuit unit 410, the processor 411 may block the power supply to the microphone (MIC) terminal included in the earjack 421 by turning off the microphone bias 415.

Figure 5:
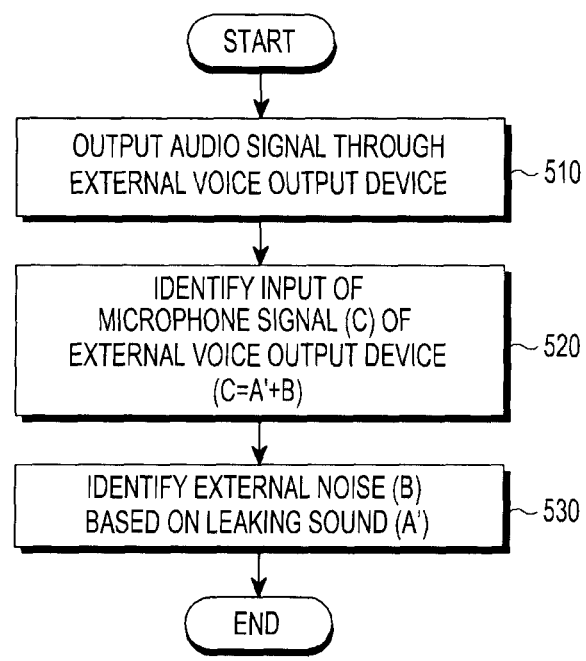
FIG. 5 is a flowchart illustrating an operation of the electronic device that controls the output of an audio signal based on another audio signal inputted through the earphones according to one embodiment of the present disclosure.

FIG. 5 is a flowchart illustrating an operation of the electronic device that controls the output of an audio signal based on another audio signal inputted through the earphones according to one embodiment of the present disclosure.

Referring to FIG. 5, in operation 510, the electronic device may output an audio signal through an external voice output device. For example, the external voice output device (for example, earphones, headphones, or speaker) may be various devices which are electrically connected to the electronic device to output the audio signal.

In operation 520, the electronic device may identify a microphone signal (C) detected by the microphone included in the external voice output device. For example, the microphone signal (C) may include external noise (B) and the leaking sound (A') that partially leaked from the audio signal outputted through the external voice output device.

In operation 530, the electronic device may identify external noise (B) based on the leaking sound (A'). For example, the electronic device may identify an audio signal in the microphone signal (C) that has frequencies similar to those of the audio signal currently outputted by the external voice output device. That audio signal may be determined to be leaking sound (A'). The rest of the microphone signal (C) may be determined to be the external noise (B).

According to one embodiment of the present disclosure, the electronic device may compare the volume of the leaking sound and the volume of the external noise and set the volume of the audio signal outputted through the external voice output device accordingly.

Figure 6:
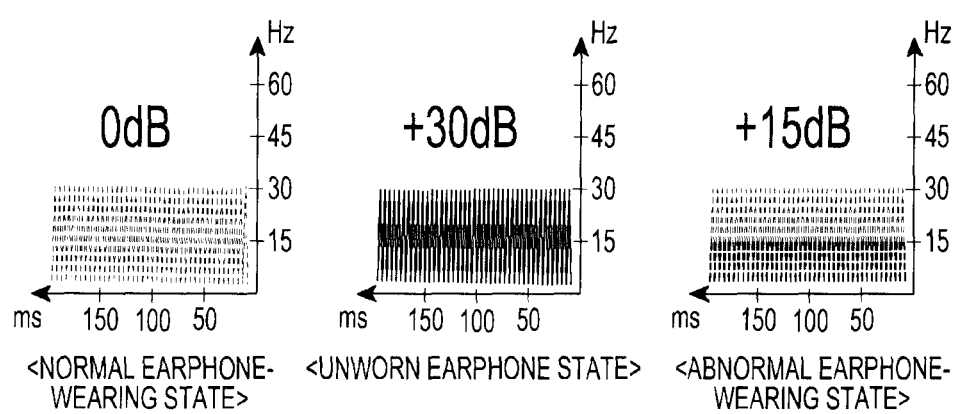
FIG. 6 are various graphs illustrating volumes of the audio signal in various states of the earphones being worn according to one embodiment of the present disclosure.

FIG. 6 are various graphs illustrating volumes of the audio signal in various states of the earphones being worn according to one embodiment of the present disclosure.

Referring to FIG. 6, the marked concentration of the graph may be proportional to the volume of the audio signal.

According to one embodiment of the present disclosure, when the audio signal is outputted to the speaker of the earphones, the electronic device may measure the leaking sound using the microphone of the earphones and determine the state when the earphones are inserted into the user's ears.

Using the leaking sound, the earphones may be determined to be in a normal wearing state, an abnormal wearing state, or an unworn state. For example, when the volume of the leaking sound is lower than a predetermined value (for example, 15 dB), the electronic device may determine that the earphones are worn normally, i.e. both speakers of the earphones are inserted into the user's ears. When the volume of the leaking sound is within a predetermined range (for example, higher than or equal to 15 dB and lower than 30 dB), the electronic device may determine that the earphones are worn abnormally. When the volume of the leaking sound is higher than or equal to a predetermined value (for example, 30 dB), the electronic device may determine that the earphones are not being worn.

According to one embodiment of the present disclosure, the electronic device may convert data indicating the earphone-wearing state into various forms of data and output the converted data through display devices, speakers, and/or motors. For example, when the earphone-wearing state is the abnormal wearing state, the electronic device may output data indicating the abnormal wearing state.

Figure 7:
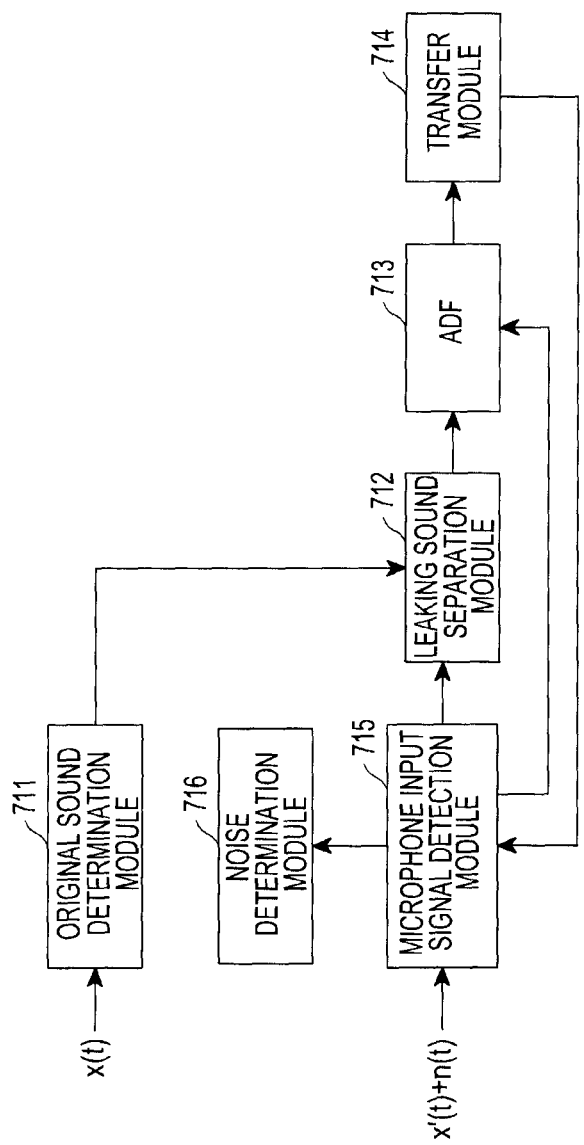
FIG. 7 is a block diagram illustrating earphones and an electronic device according to one embodiment of the present disclosure.

FIG. 7 is a block diagram illustrating the earphones and an electronic device according to one embodiment of the present disclosure.

Referring to FIG. 7, the electronic device 701 may output an audio signal (x(t)) through the speaker 722 of earphones 702 and control the output of the audio signal (x(t)) through signals detected by the microphone 721 of the earphones 702.

A processor of the electronic device 701 may include circuits for processing the audio signal, and the circuits may include an original sound determination module 711, a leaking sound separation module 712, an Adaptive Filter (ADF) 713, a transfer module 714, a microphone input signal detection module 715, and a noise determination module 716.

According to one embodiment of the present disclosure, the earphones may include the microphone 721 and the speaker 722, and when the audio signal (x(t)) transmitted from the electronic device is outputted through the speaker 722, a signal (x'(t)) partially leaked from the audio signal and external noise (n(t)) may be detected by the microphone 721.

When the audio signal (x(t)) is outputted, the original sound determination module 711 may identify frequency settings, volume, and tone of the audio signal (x(t)).

The leaking sound separation module 712 may identify the partial signal leaked from the audio signal (x(t)) when there is a gap between user's ear canals and the earphones. The leaking sound separation module 712 may determine the leaking sound x'(t) by filtering the audio signal (x(t)) identified by the original sound determination module 711 from the audio signal (x'(t)+n(t)).

The ADF 713 may remove the leaking sound (x'(t)) identified by the leaking sound separation module 712 from the audio signal (x'(t)+n(t)) detected by the microphone 721.

The transfer module 714 may transfer the leaking sound (x'(t)) separated by the ADF 713 to the microphone input signal detection module 715 in real time through a transfer function (w(z)).

According to one embodiment of the present disclosure, from the time point at which the earphones are inserted into the electronic device and the audio signal is outputted to the time point at which the output of the audio signal stops or the earphones are removed, the transfer module 714 may transfer the signal separated through the ADF 713 to the microphone input signal detection module 715.

The microphone input signal detection module 715 may identify the component of the leaking sound (x'(t)) transferred through the transfer module 714 and identify a signal corresponding to the leaking sound (x'(t)) in the signal input into the microphone 721. For example, the signal detected by the microphone 721 may include the leaking sound (x'(t)) leaked from the audio signal (x(t)) and external noise (n(t)).

The noise determination module 716 may determine that the signal obtained by removing the leaking sound (x'(t)) from the signal detected by the microphone 721 is external noise (n(t)).

Figure 8:
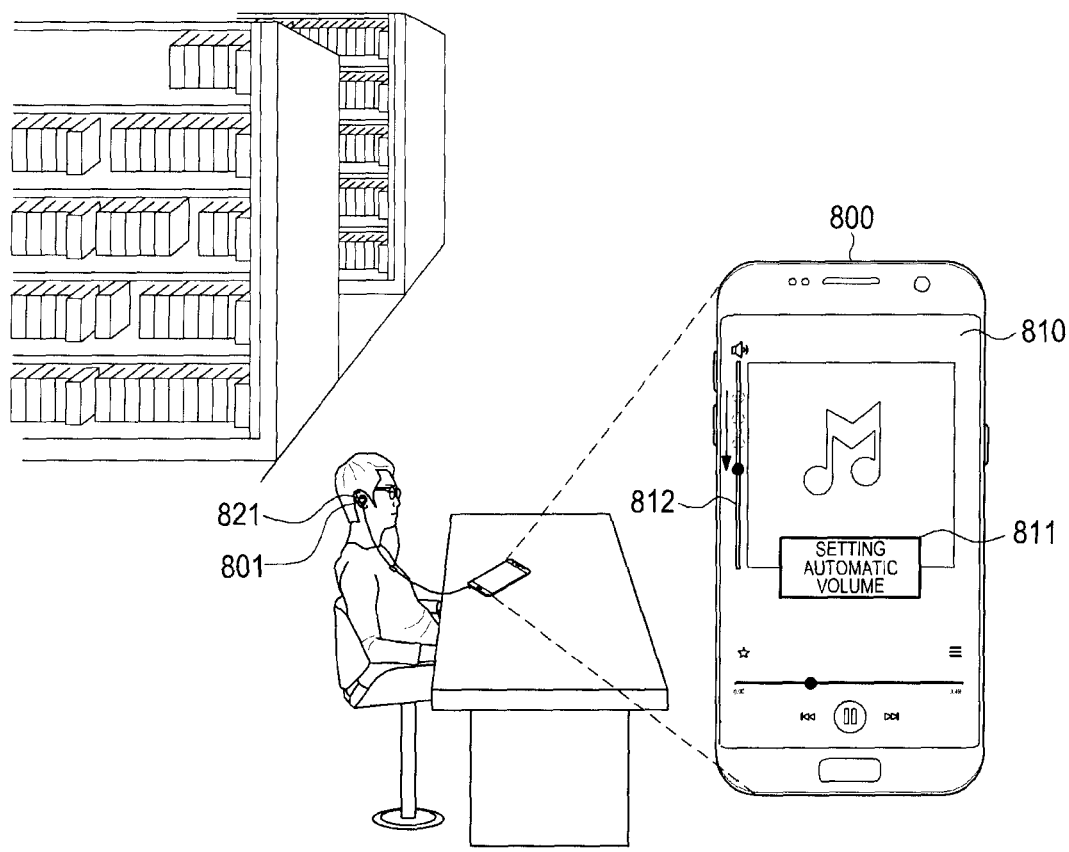
FIG. 8 is a view illustrating a situation in which the electronic device processes an audio signal based on another audio signal inputted through the microphone of the earphones according to one embodiment of the present disclosure.

FIG. 8 is a view illustrating a situation in which the electronic device processes an audio signal based on another audio signal input through the microphone of the earphones according to one embodiment of the present disclosure.

Referring to FIG. 8, a user of the electronic device 800 may listen to an audio signal through earphones 801 electrically connected to the electronic device 800.

According to one embodiment of the present disclosure, the electronic device 800 may control the output of the audio signal output through the earphones 801 based on another audio signal detected by the microphone 821 of the earphones 801, and display a message related to the control thereof.

According to one embodiment of the present disclosure, when the user abnormally wears the earphones 801 (for example, when the user only wears on of the speakers) and thus a generated leaking sound whose volume is larger than the volume of ambient noise, the electronic device 800 may control lower the volume of the audio signal outputted by the speakers of the earphones. For example, the electronic device 800 may lower the volume of the audio signal so that the volume difference between the leaking sound and the ambient noise falls within a predetermined range.

According to one embodiment of the present disclosure, when the electronic device 800 sets the volume of the audio signal based on the other audio detected by the microphone of the earphones 801, the electronic device 800 may display a notification message 811 indicating automatic setting of the volume. The electronic device 800 may further move an indicator indicating the current volume on a progress bar 812 after automatically setting the volume.

According to one embodiment of the present disclosure, when a leaking sound higher than the ambient noise is generated, the electronic device 800 may control to turn down the volume of the audio signal, so that the user can listen to the audio signal without disturbing other users around the user.

Figure 9:
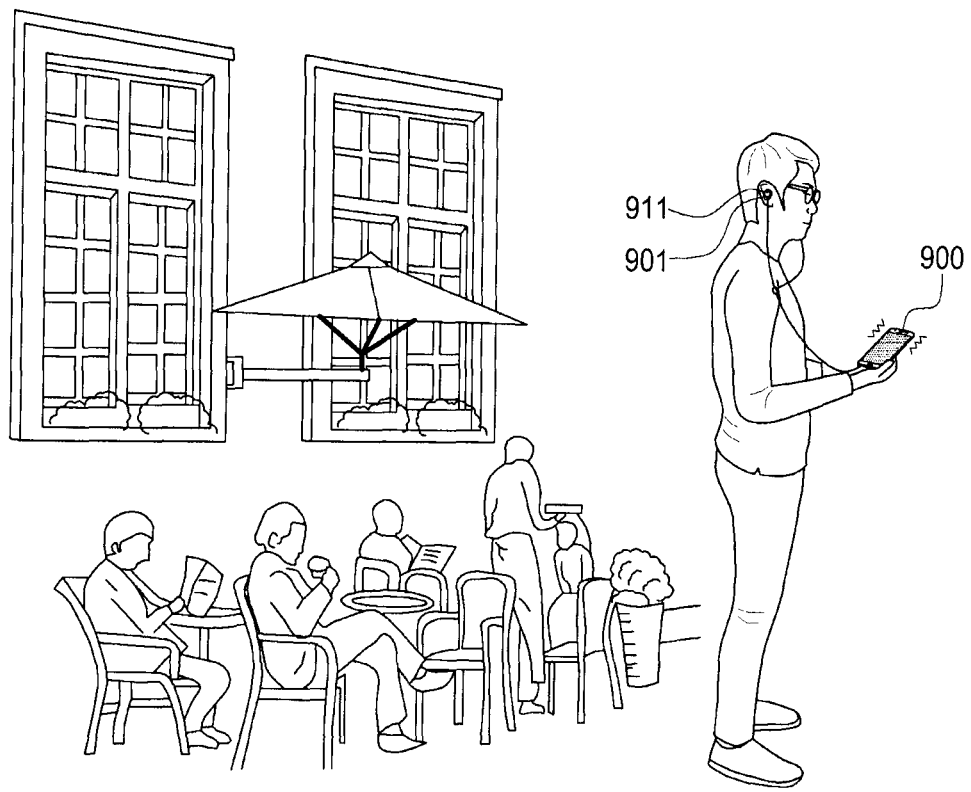
FIG. 9 is another view illustrating a situation in which the electronic device processes an audio signal based on another audio signal inputted though the microphone of the earphones according to one embodiment of the present disclosure.

FIG. 9 is another view illustrating a situation in which the electronic device processes an audio signal based on another audio signal inputted though the microphone of the earphones according to one embodiment of the present disclosure.

Referring to FIG. 9, a user of an electronic device 900 may listen to an audio signal through earphones 901 electrically connected to the electronic device 900.

According to one embodiment of the present disclosure, the electronic device 900 may control the output of the audio signal output through the earphones 901 based on another audio signal inputted through a microphone 911 of the earphones 901 and output vibration data related to the control thereof. For example, the vibration data may be set to have a vibration pattern including various vibration speeds and periods to indicate that the volume of the output audio signal is automatically set, and may be set to be output at a high or low level.

According to one embodiment of the present disclosure, when the volume of the ambient noise is higher than the volume of the leaking sound even though the user wears the earphones 901 normally, such as when the user is located in a noisy place, the electronic device 900 may control to raise the volume of the audio signal. The electronic device 900 may set the volume of the audio signal so that the volume difference between the leaking sound and the ambient noise falls within a predetermined range.

According to one embodiment of the present disclosure, when the volume of the audio signal is set based on the signal detected be the microphone of the earphones 901, the electronic device 900 may generate vibration data indicating that the volume of the audio signal is automatically set high due to the external noise.

According to one embodiment of the present disclosure, in this instance, the user may have difficulty listening to the audio signal because of ambient noise. Subsequently, the volume of the audio signal may be automatically raised, and the user may be notified of the automatic raise by a vibration notification from the electronic device 900.

Figure 10:
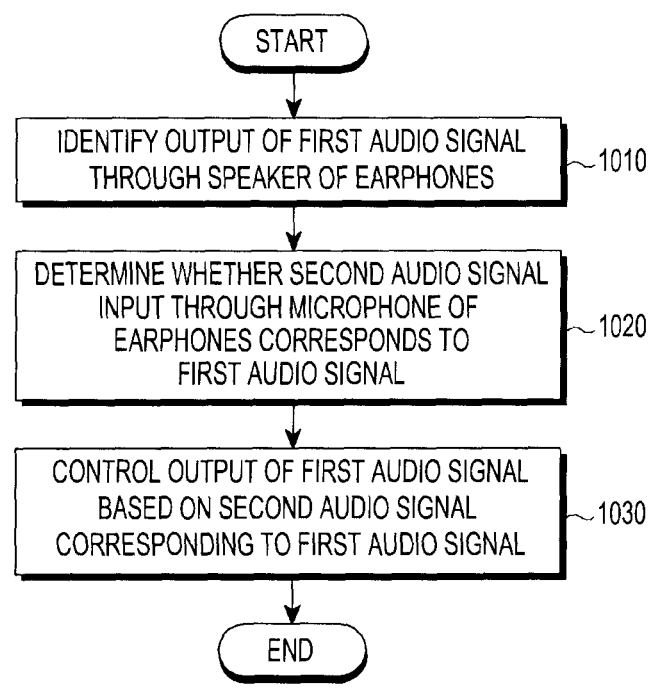
FIG. 10 is a flowchart illustrating an operation of the electronic device that controls the output of an audio signal based on another audio signal inputted through the earphones according to one embodiment of the present disclosure.

FIG. 10 is a flowchart illustrating an operation of the electronic device that controls the output of an audio signal based on another audio signal inputted through the earphones according to one embodiment of the present disclosure.

Referring to FIG. 10, in operation 1010, the electronic device may identify that a first audio signal is outputted through the speaker of the earphones electrically connected to the electronic device.

In operation 1020, the electronic device may determine whether a second audio signal is inputted through (e.g. detected by) the microphone of the earphones. If so, the electronic device may further determined whether the second audio signal corresponds to the first audio signal. For example, as the second audio signal includes a frequency component similar to the first audio signal, the electronic device may determine that the first and second audio signals correspond to each other, and may determine that the second audio signal is sound that leaked from the first audio signal to the outside of the user's ears.

When the second audio signal corresponds to the first audio signal based on the result of operation 1020, the electronic device may control the output of the first audio signal in operation 1030.

Figure 11:
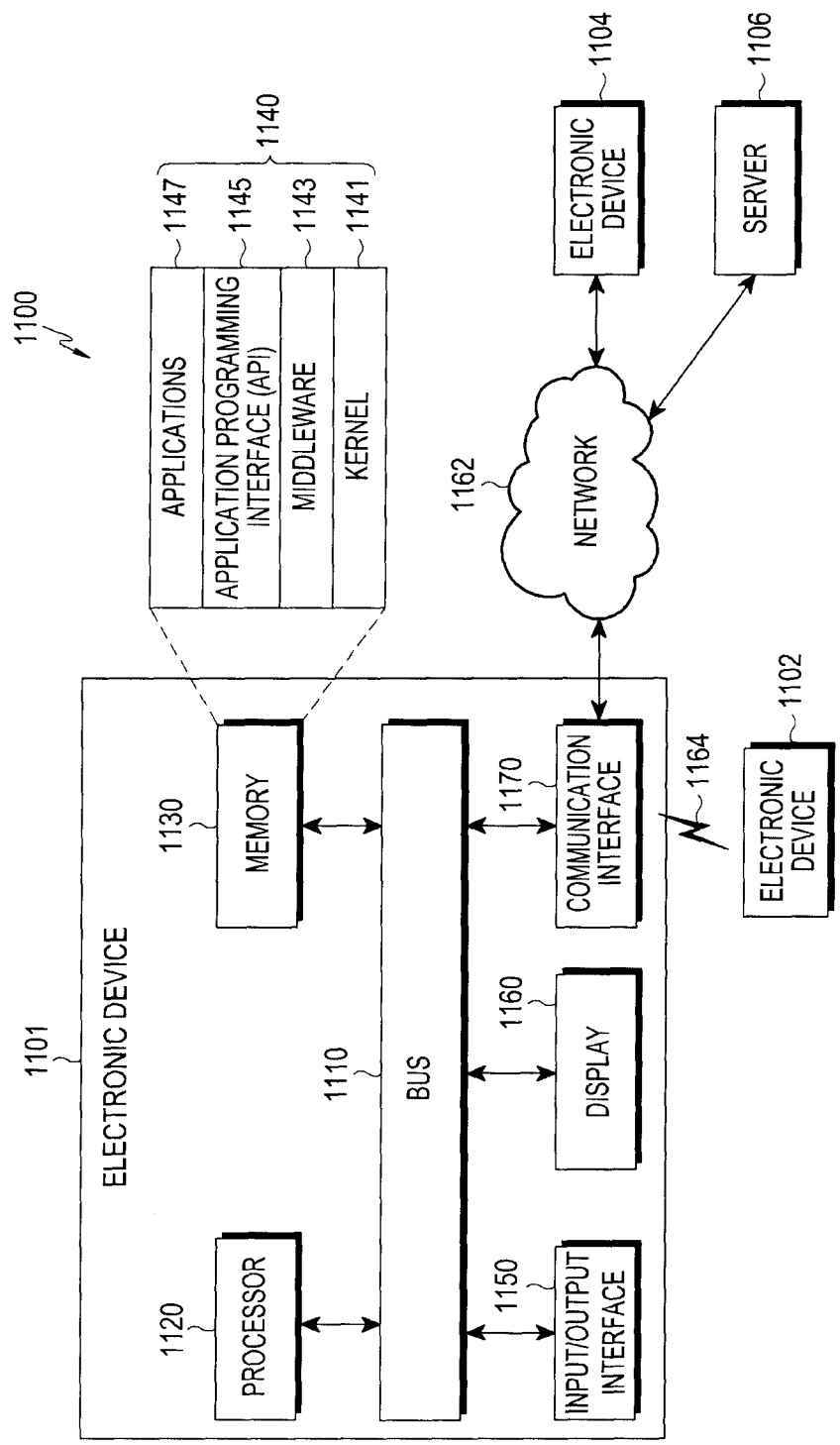
FIG. 11 is a block diagram illustrating a network environment according to one embodiment of the present disclosure.

FIG. 11 is a block diagram illustrating an example of a network environment according to one embodiment of the present disclosure.

Referring to FIG. 11, an electronic device 1101 within a network environment 1100 is illustrated, and the electronic device 1101 may include a bus 1110, a processor 1120, a memory 1130, an input/output interface 1150, a display 1160, and a communication interface 1170.

According to various embodiments of the present disclosure, the electronic device 1101 may omit at least one of the elements, or may additionally include another element. The bus 1110 may include, for example, a circuit that interconnects the elements 1110 to 170 and transfers communication (for example, control messages and/or data) between the elements. The processor 1120 may include one or more of a central processing unit, an application processor, and a communication processor (CP). The processor 1120, for example, may carry out operations or data processing relating to the control and/or communication of at least one other element of the electronic device 1101. The processor 1120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 1130 may include a volatile and/or non-volatile memory. The memory 1130 may store, for example, instructions or data relevant to at least one other element of the electronic device 1101. According to an embodiment, the memory 1130 may store software and/or a program 1140. The program 1140 may include, for example, kernel 1141, middleware 1143, application programming interface (API) 1145, and/or application programs (or "applications") 1147. At least a part of the kernel 1141, the middleware 1143, or the API 1145 may be referred to as an Operating System (OS). For example, the kernel 1141 may control or manage the system resources (for example, the bus 1110, the processor 1120, the memory 1130, and the like) that are used to execute operations or functions implemented in the other programs (for example, the middleware 1143, the API 1145, and the application programs 1147). Furthermore, the kernel 1141 may provide an interface through which the middleware 1143, the API 1145, or the application programs 1147 may access the individual elements of the electronic device 1101 to control or manage the system resources.

The middleware 1143 may function as, for example, an intermediary for allowing the API 1145 or the application programs 1147 to communicate with the kernel 1141 to exchange data. Furthermore, the middleware 1143 may process one or more task requests, which are received from the application programs 1147, according to priorities thereof. For example, the middleware 1143 may assign priorities for using the system resources (for example, the bus 1110, the processor 1120, the memory 1130, or the like) of the electronic device 1101 to one or more of the application programs 1147, and may process the one or more task requests. The API 1145 is an interface used by the applications 1147 to control a function provided from the kernel 1141 or the middleware 1143, and may include, for example, at least one interface or function (for example, instruction) for file control, window control, image processing, text control, or the like. For example, the input/output interface 1150 may forward instructions or data, input from a user or an external device, to the other element(s) of the electronic device 1101, or may output instructions or data, received from the other element(s) of the electronic device 1101, to the user or the external device.

The display 1160 may include, for example, a liquid crystal display (LCD), a light-emitting diode (LED) display, an organic light-emitting diode (OLED) display, a micro electro mechanical system (MEMS) display, or an electronic paper display. The display 1160 may display, for example, various types of content (for example, text, images, videos, icons, and/or symbols) to the user. The display 1160 may include a touch screen and may receive, for example, a touch, gesture, proximity, or hovering input by using an electronic pen or a part of the user's body. The communication interface 1170 may configure communication, for example, between the electronic device 1101 and an external device (for example, a first external electronic device 1102, a second external electronic device 1104, or a server 1106). For example, the communication interface 1170 may be connected to a network 1162 through wireless or wired communication to communicate with the external device (for example, the second external electronic device 1104 or the server 1106).

The wireless communication may include, for example, cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth low energy (BLE), ZigBee, near field communication (NFC), magnetic secure transmission, Radio Frequency (RF), and body area network (BAN). According to an embodiment, the wired communication may include GNSS. The GNSS may be, for example, the global positioning system (GPS), the global navigation satellite system (Glonass), the Beidou navigation satellite system (hereinafter, referred to as "Beidou"), or Galileo (the European global satellite-based navigation system). Hereinafter, in this document, the term "GPS" may be interchangeable with the term "GNSS". The wired communication may employ, for example, Universal Serial Bus (USB), High Definition Multimedia Interface (HDMI), Recommended Standard 232 (RS-232), Plain Old Telephone Service (POTS), and the like. The network 1162 may include a telecommunications network such as a computer network (for example, a LAN or a WAN), the Internet, or a telephone network.

Each of the first and second external electronic devices 1102 and 1104 may be the same as or different from the electronic device 1101. According to one embodiment, all or some of the operations performed by the electronic device 1101 may be performed by another electronic device or a plurality of electronic devices (for example, the external electronic device 1102 or 1104 or the server 1106). According to an embodiment, when the electronic device 1101 has to perform some functions or services automatically or in response to a request, the electronic device 1101 may request another device (for example, the external electronic device 1102 or 1104 or the server 1106) to perform at least some functions relating thereto instead of, or in addition to, performing the functions or services by itself. Another electronic device (for example, the external electronic device 1102 or 1104, or the server 1106) may execute the requested functions, and may deliver the result of execution to the electronic apparatus 1101. The electronic device 1101 may process the received result as it is, or additionally, may provide the requested function or service. To this end, for example, cloud computing, distributed computing, or client-server computing technology may be used.

Figure 12:
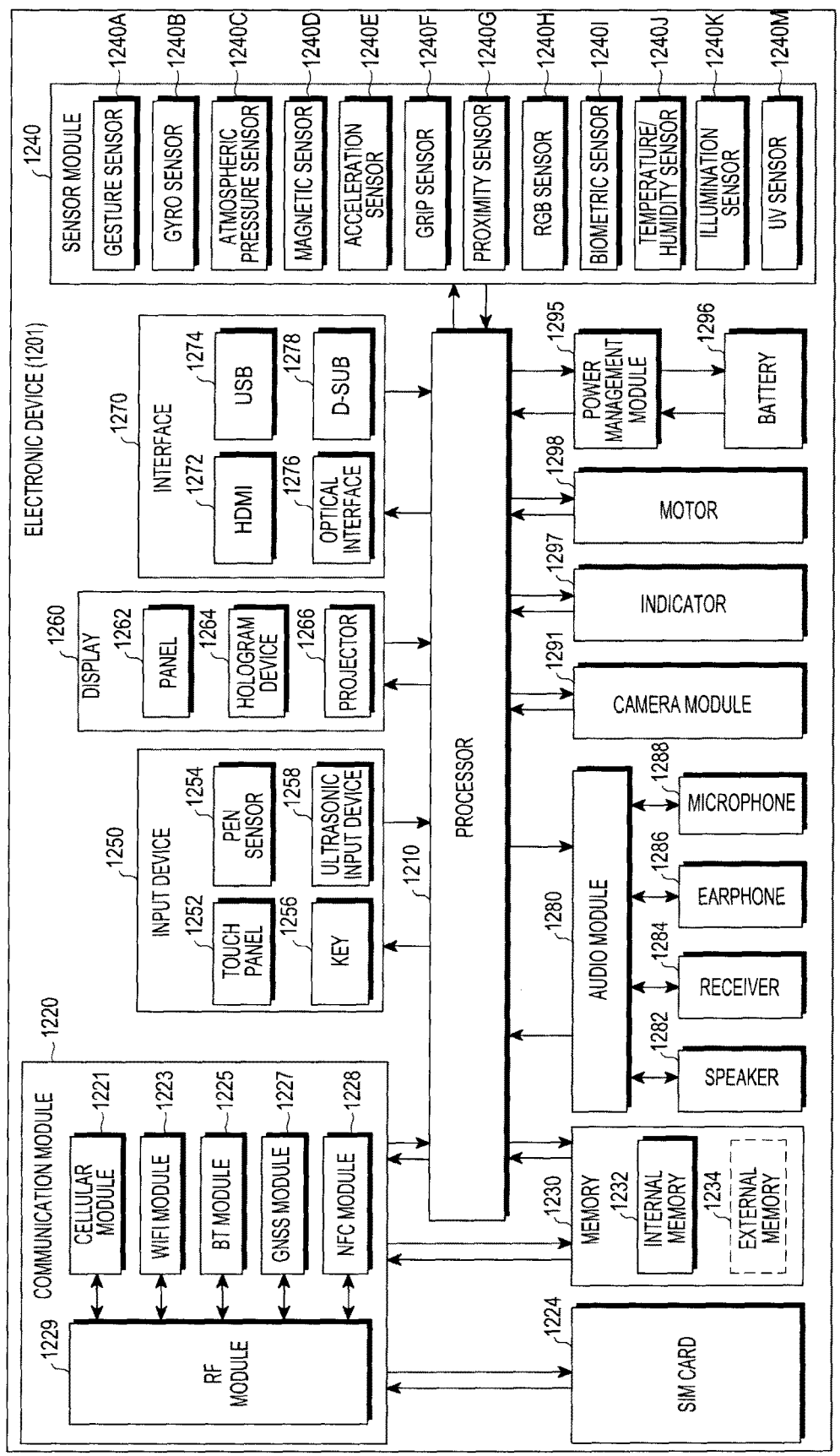
FIG. 12 is a block diagram illustrating an electronic device according to one embodiment of the present disclosure.

FIG. 12 is a block diagram illustrating an electronic device according to one embodiment of the present disclosure.

According to one embodiment of the present disclosure, an electronic device 1201 may include all or some of the elements of the electronic device 1101 illustrated in FIG. 11.

Referring to FIG. 12, the electronic device 1201 may include one or more processors (for example, APs) 1210, a communication module 1220, a subscriber identification module 1224, a memory 1230, a sensor module 1240, an input device 1250, a display 1260, an interface 1270, an audio module 1280, a camera module 1291, a power management module 1295, a battery 1296, an indicator 1294, and a motor 1298. The processor 1210 may drive, for example, an operating system or application programs to control a plurality of hardware or software elements connected thereto, and may perform various types of data processing and operations. The processor 1210 may be embodied, for example, as a System on Chip (SoC). According to an embodiment, the processor 1210 may further include a graphic processing unit (GPU) and/or an image signal processor. The processor 1210 may also include at least some (for example, a cellular module 1221) of the elements illustrated in FIG. 12. The processor 1210 may load, in volatile memory, instructions or data received from at least one of the other elements (for example, non-volatile memory), process the loaded instructions or data, and store the resultant data in the non-volatile memory.

The communication module 1220 may have a configuration that is the same as, or similar to, that of the communication interface 1170. The communication module 1220 may include, for example, a cellular module 1221, a Wi-Fi module 1223, a Bluetooth module 1225, a GNSS module 1227, an NFC module 1228, and an RF module 1229. The cellular module 1221 may provide, for example, voice calls, video calls, text message services, Internet services, or the like through a communication network. According to an embodiment, the cellular module 1221 may identify and authenticate the electronic device 1201 within the communication network using the subscriber identification module 1224 (for example, a SIM card). According to an embodiment, the cellular module 1221 may perform at least some of the functions that the processor 1210 may provide. According to an embodiment, the cellular module 1221 may include a communication processor (CP). According to some embodiments, at least some (for example, two or more) of the cellular module 1221, the Wi-Fi module 1223, the BT module 1225, the GNSS module 1227, and the NFC module 1228 may be included in one Integrated Chip (IC) or IC package. The RF module 1229, for example, may transmit/receive a communication signal (for example, an RF signal). The RF module 1229 may include, for example, transceivers, power amp modules (PAM), frequency filters, low-noise amplifiers (LNA), antennas, or the like. According to another embodiment, at least one of the cellular module 1221, the Wi-Fi module 1223, the BT module 1225, the GNSS module 1227, and the NFC module 1228 may transmit/receive the RF signal through a separate RF module. The subscriber identification module 1224 may be, for example, a card that includes a subscriber identification module, or an embedded SIM, and may contain unique identification information (for example, an integrated circuit card identifier (ICCID)) or subscriber information (for example, international mobile subscriber identity (IMSI)).

According to one embodiment of the present disclosure, when communication connection with an external electronic device (for example, the electronic device 100a) including a speaker and a microphone is established, the communication module 1220 may receive an audio signal inputted into the microphone from the external electronic device and transmit a signal for controlling another audio signal transmitted to the external electronic device based on the received signal.

The memory 1230 (for example, the memory 1130) may include, for example, an internal memory 1232 or an external memory 1234. The internal memory 1232 may be a volatile memory (for example, a DRAM, an SRAM, an SDRAM, and the like) or a non-volatile memory (for example, a one-time programmable ROM (OTPROM), a PROM, an EPROM, an EEPROM, a mask ROM, a flash ROM, a flash memory, a hard disc drive, or a solid state drive (SSD)). The external memory 1234 may be a flash drive, for example, a compact flash (CF), a secure digital (SD), a Micro-SD, a Mini-SD, an eXtreme digital (xD), a multimedia card (MMC), a memory stick, and the like. The external memory 1234 may be functionally and/or physically connected to the electronic device 1201 through various interfaces.

The sensor module 1240 may, for example, measure a physical quantity or detect the operating state of the electronic device 1201, and may convert the measured or detected information into an electrical signal. The sensor module 1240 may include, for example, at least one of the gesture sensor 1240A, the gyro sensor 1240B, the atmospheric pressure sensor 1240C, the magnetic sensor 1240D, the acceleration sensor 1240E, the grip sensor 1240F, the proximity sensor 1240G, the color sensor 1240H (for example, a Red, Green, and Blue (RGB) sensor), the biometric sensor 1201, the temperature/humidity sensor 1240J, the illumination sensor 1240K, and/or the ultraviolet (UV) sensor 1240M. Additionally or alternatively, the sensor module 1240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling one or more sensors included therein. In some embodiments, the electronic device 1201 may further include a processor, which is configured to control the sensor module 1240, as a part of the processor 1210 or separately from the processor 1210 in order to control the sensor module 1240 while the processor 1210 is in a sleep state.

The input device 1250 may include, for example, a touch panel 1252, a (digital) pen sensor 1254, a key 1256, or an ultrasonic input device 1258. The touch panel 1252 may use capacitive, resistive, infrared, or ultrasonic detection methods. The touch panel 1252 may further include a control circuit. The touch panel 1252 may further include a tactile layer to provide tactile feedback to the user. The (digital) pen sensor 1254 may include, for example, a recognition sheet that is a part of, or separate from, the touch panel. The key 1256 may include, for example, a physical button, an optical key, or a keypad. The ultrasonic input device 1258 may detect ultrasonic waves, which are generated by an input tool, through a microphone (for example, a microphone 1288), and may identify data corresponding to the detected ultrasonic waves.

The display 1260 (for example, the display 1160) may include the panel 1262, the hologram device 1264, the projector 1266, and/or a control circuit for controlling them. The panel 1262 may be implemented to be, for example, flexible, transparent, or wearable. The panel 1262, together with the touch panel 1252, may be configured as one or more modules. According to an embodiment, the panel 1262 may include a pressure sensor (or a POS sensor), which may measure the strength of pressure of a user's touch. The pressure sensor may be implemented such that it is integrated with the touch panel 1252, or may be implemented by one or more sensors separated from the touch panel 1252. The hologram device 1264 may show a three-dimensional image in the air using the interference of light. The projector 1266 may display an image by projecting light onto a screen. The screen may be located, for example, in the interior of, or on the exterior of, the electronic device 1201. The interface 1270 may include, for example, HDMI 1272, USB 1274, optical 1276, or a D-subminiature (D-sub) 1278 interfaces. The interface 1270 may be included, for example, in the communication interface 1170 illustrated in FIG. 11. Additionally or alternatively, the interface 1270 may include, for example, a mobile high-definition link (MHL) interface, an SD card/multimedia card (MMC) interface, or an infrared data association (IrDA) standard interface.

The audio module 1280, for example, may convert sound into electrical signals and vice versa. At least some elements of the audio module 1280 may be included, for example, in the input/output interface 1150 illustrated in FIG. 11. The audio module 1280 may process sound information that is input or output through, for example, the speaker 1282, the receiver 1284, the earphones 1286, the microphone 1288, and the like. The camera module 1291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 1295 may manage, for example, the power of the electronic device 1201. According to an embodiment, the power management module 1295 may include a power management integrated circuit (PMIC), a charger IC, or a battery or fuel gauge. The PMIC may employ wired and/or wireless charging. Examples of the wireless charging method may include magnetic resonance charging, magnetic induction charging, electromagnetic wave charging, and the like. Additional circuits (for example, coil loops, resonance circuits, rectifiers, and the like) for wireless charging may be further included. The battery gauge may measure, for example, the remaining charge of the battery 1296 and a voltage, current, or temperature while charging. The battery 1296 may be, for example, a rechargeable battery and/or a solar battery.

The indicator 1297 may display a particular state of the electronic device 1201, such as states when the electronic device 1201 is booting, transceiving messages, charging, or the like. The motor 1298 may convert an electrical signal into a mechanical vibration and may generate vibration, haptic feedback, etc. The electronic device 1201 may include a mobile TV support device (for example, a GPU) that can process media data according to a standard, such as digital multimedia broadcasting (DMB), digital video broadcasting (DVB), mediaFlo™, or the like. Each of the above-described component elements of hardware according to the present disclosure may be configured with one or more components, and the names of the corresponding component elements may vary based on the type of electronic device. In various embodiments, an electronic device (for example, the electronic device 1201) may omit some elements, or may further include additional elements, or some of the elements of the electronic device may be combined with each other to configure one entity, in which case the functions of the corresponding elements prior to the combination may be performed as original.

Figure 13:
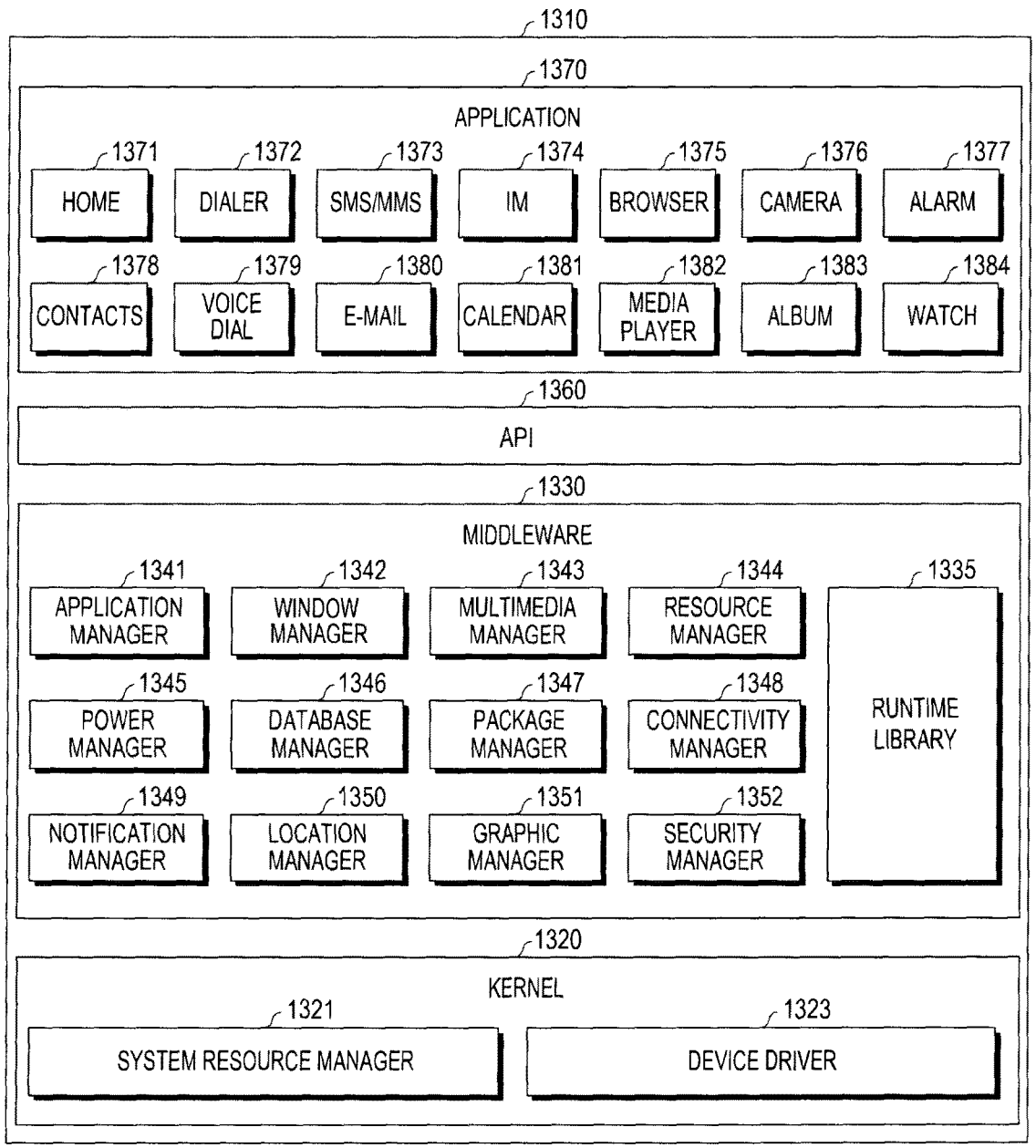
FIG. 13 is a block diagram illustrating a program module according to one embodiment of the present disclosure.

FIG. 13 is a block diagram illustrating a program module according to one embodiment of the present disclosure.

According to one embodiment of the present disclosure, a program module 1310 (for example, the program 1140) may include an operating system that controls resources related to the electronic device (for example, the electronic device 1101) and/or various applications (for example, the application programs 1147) driven on the operating system. The operating system may include, for example, Android™, iOS™, Windows™, Symbian™, Tizen™, or Bada™.

Referring to FIG. 13, the program module 1310 may include the kernel 1320 (for example, the kernel 1141), the middleware 1330 (for example, the middleware 1143), the API 1360 (for example, the API 1145), and/or applications 1370 (for example, the application programs 1147). At least a part of the program module 1310 may be preloaded on the electronic device, or may be downloaded from an external electronic device (for example, the external electronic device 1102 or 804 or the server 1106).

The kernel 1320 may include, for example, the system resource manager 1321 and/or the device driver 1323. The system resource manager 1321 may control, allocate, or retrieve system resources. According to an embodiment, the system resource manager 1321 may include a process manager, a memory manager, or a file system manager. The device driver 1323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 1330 may provide functions that the applications 1370 need in common, or may provide various functions to the applications 1370 through the API 1360 so that the applications 1370 can efficiently use the limited system resources within the electronic device. According to an embodiment, the middleware 1330 may include at least one of the runtime library 1335, the application manager 1341, the window manager 1342, the multimedia manager 1343, the resource manager 1344, the power manager 1345, the database manager 1346, the package manager 1347, the connectivity manager 1348, the notification manager 1349, the location manager 1350, the graphic manager 1351, and the security manager 1352.

The runtime library 1335 may include, for example, a library module that a compiler uses in order to generate new functions while the applications 1370 are being executed. The runtime library 1335 may manage input/output, manage memory, or process arithmetic functions. The application manager 1341 may manage, for example, the life cycles of the applications 1370. The window manager 1342 may manage GUI resources used for screens displayed by the electronic device. The multimedia manager 1343 may identify formats required for reproducing various media files, and may encode or decode the media files using codecs suitable for the corresponding formats of the media files. The resource manager 1344 may manage the source code of the applications 1370 or space in memory. The power manager 1345 may manage, for example, the capacity or power of a battery and may provide power information required for operating the electronic device. According to an embodiment, the power manager 1345 may operate in conjunction with the basic input/output system (BIOS). The database manager 1346 may, for example, generate, search, or change databases to be used by the applications 1370. The package manager 1347 may manage the installation or updates of applications that are distributed in the form of package files.

The connectivity manager 1348 may manage, for example, a wireless connection. The notification manager 1349 may provide an event (for example, a received message, an appointment, a proximity notification, and the like) to a user. The location manager 1350 may manage, for example, information about the location of the electronic device. The graphic manager 1351 may manage graphic effects to be provided to the user and user interfaces relating to the graphic effects. The security manager 1352 may provide, for example, system security or user authentication. According to an embodiment, the middleware 1330 may include a telephony manager for managing the voice or video call function of the electronic device or a middleware module that is capable of forming a combination of the functions of the above-described elements. According to an embodiment, the middleware 1330 may include specialized modules according to the type of operating systems. Furthermore, the middleware 1330 may dynamically remove some of the existing elements, or may add new elements. The API 1360 is, for example, a set of API programming functions, which may vary depending on the operating system. For example, in the case of Android, one API suitable for Android may be provided. But when the OS is Tizen, two or more API sets may be provided.

The applications 1370 may include applications such as home 1371, dialer 1372, SMS/MMS 1373, instant messaging (IM) 1374, browser 1375, camera 1376, alarm 1377, contacts 1378, voice dialer 1379, e-mail 1380, calendar 1381, media player 1382, photo album 1383, clock 1384, health care (for example, for measuring exercise quantity undertaken by the user or blood glucose of the user), environment information (for example, for measuring atmospheric pressure, humidity, or temperature), and the like. According to an embodiment, the applications 1370 may include an information exchange application that can support the exchange of information between the electronic device and an external electronic device. The information exchange application may include, for example, a notification relay application for relaying particular information to the external electronic device or a device management application for managing the external electronic device. For example, the notification relay application may relay notification information generated in applications of the electronic device to the external electronic device, or may receive notification information from the external electronic device and provide the received notification information to a user. The device management application may install, delete, or update the functions of the external electronic device that communicates with the electronic device (for example, turning on/off the external electronic device itself (or some elements thereof) or adjusting the brightness (or resolution) of a display of the external electronic device). According to an embodiment, the applications 1370 may include applications (for example, a health care application of a mobile medical appliance) that are designated according to the attributes of the external electronic device. According to an embodiment, the applications 1370 may include applications received from the external electronic device. At least some of the program module 1310 may be implemented in software, firmware, hardware (for example, the processor 1210), or a combination of two or more thereof, and may include modules, programs, routines, instruction sets, or processes for performing one or more functions.

Figure 14:
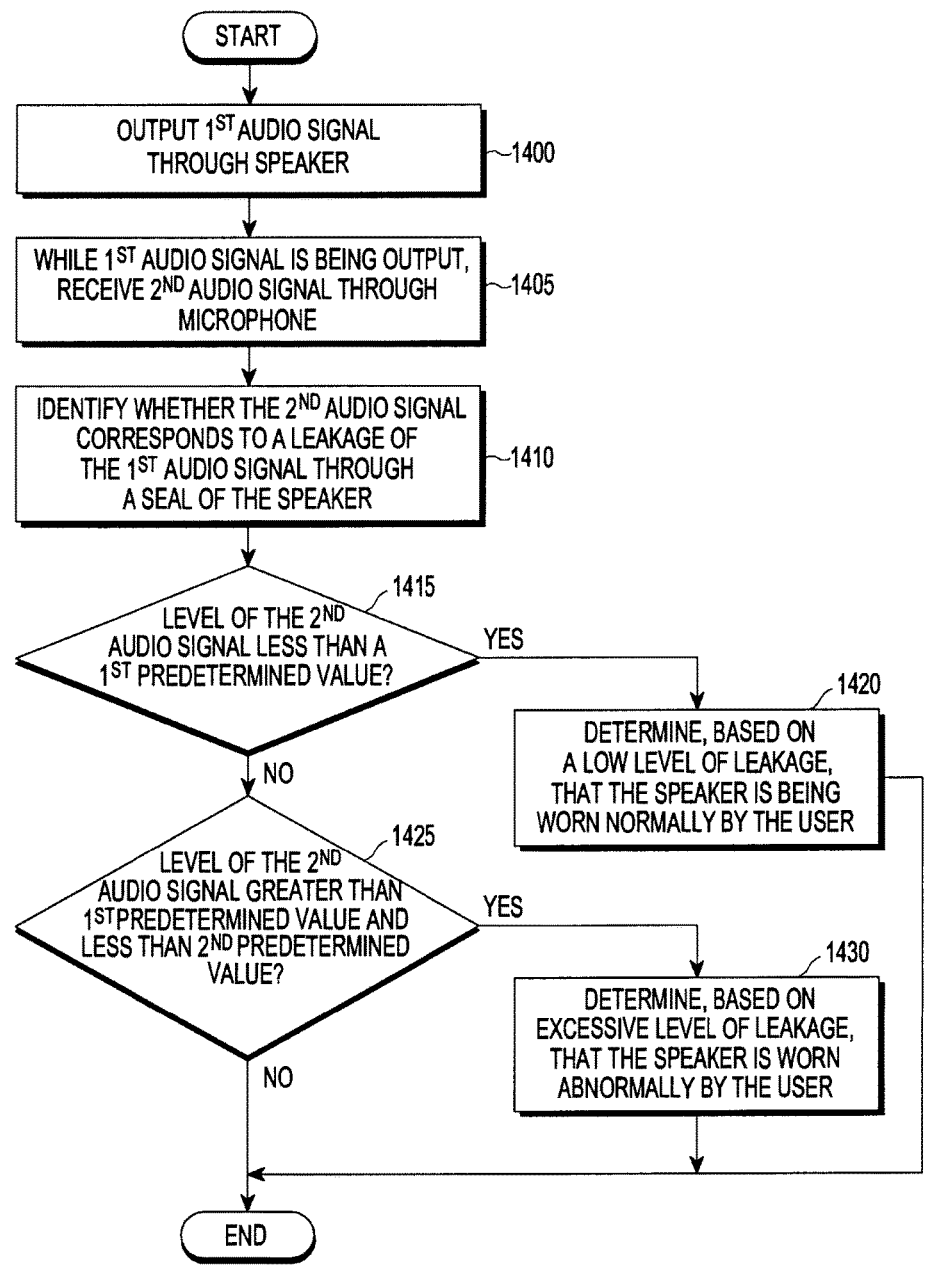
FIG. 14 is a flowchart illustrating an operation of the electronic device that controls a determination as to whether the speaker is abnormally worn by a user.

FIG. 14 is a flowchart illustrating an operation of the electronic device that controls a determination as to whether the speaker is abnormally worn by a user. In operation, in step 1400 a first audio signal is output through the speaker. In step 1405, while the first audio signal is output through the speaker, a second audio signal is received through the microphone and then identify whether the second audio signal corresponds to the first audio signal indicating leakage of the first audio signal from the seal in step 1410. In Step 1415, it is determined whether level of hte second audio signal is less than a first predetermined value, and if so, it is determined that the speaker is being worn normally by the user in step 1420. when a detected volume level of an ouput of the second audio signal is less than a first predetermined value, it is determined that the speaker is worn normally by the user in step 1425. In step 1430, when the detected volume level of the output of the second audio signal is greater the first predetermined value and less than a second predetermined value due to the leakage, it is determined that the speaker is worn abnormally by the user.

The term "module" as used herein may include a unit consisting of hardware, software, or firmware, and may, for example, be used interchangeably with the term "logic," "logical block," "component," "circuit," or the like. The "module" may be an integrated component. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by instructions which are stored a computer-readable storage medium (e.g., the memory 1130) in the form of a program module. The instructions, when executed by a processor (e.g., the processor 1120), may cause the one or more processors to execute the function corresponding to the instructions. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instructions may include code which is made by a compiler or code which may be executed by an interpreter.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations disclosed herein may have their orders altered, may be omitted, or may further include other operations.

According to one embodiment, a storage medium of an electronic device storing instructions that, when executed by at least one processor, cause the at least one processor to perform operations is provided. The operations includes: outputting a first audio signal through a speaker functionally connected to the electronic device; identifying that a second audio signal detected by a microphone functionally connected to the electronic device corresponds to the first audio signal when the first audio signal is outputted through the speaker; identifying a third audio signal detected by the microphone that is different from the second audio signal; and controlling output of the first audio signal based on identifying the second audio signal and the third audio signal.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device, comprising:
a processor functionally connected to a speaker including a seal wearable by a user, and a microphone; and
a memory electrically connected to the processor,
wherein the memory includes instructions, executable by the processor to cause the electronic device to:
output a first audio signal through the speaker;
while the first audio signal is output through the speaker, receive a second audio signal through the microphone and identifying whether the second audio signal corresponds to the first audio signal indicating leakage of the first audio signal from the seal; and
control output of the first audio signal based on the identification, including:
when a detected volume level of an output of the second audio signal is less than a first predetermined value, determining that the speaker is worn normally by the user, and
when the detected volume level of the output of the second audio signal is greater the first predetermined value and less than a second predetermined value due to the leakage, determining that the speaker is worn abnormally by the user.

2. The electronic device of claim 1, wherein the instructions further cause the processor to identify a third audio signal detected by the microphone that is different from the second audio signal.

3. The electronic device of claim 2, wherein the instructions further cause the processor to control the output of the first audio signal based on a level of the third audio signal.

4. The electronic device of claim 2, wherein the instructions further cause the processor to control the output of the first audio signal based on a comparison of levels of the second audio signal and the third audio signal.

5. The electronic device of claim 2, wherein, when a level of the second audio signal is higher than a level of the third audio signal, the instructions further cause the processor to reduce a level of the first audio signal.

6. The electronic device of claim 5, further comprising a motor, wherein the instructions further cause the processor to output vibration data through the motor when the level of the first audio signal is reduced.

7. The electronic device of claim 2, wherein the instructions further cause the processor to:
determine a frequency band where a level of the third audio signal is higher than a level of the first audio signal; and
increase a level of a portion of the first audio signal in the frequency band.

8. The electronic device of claim 2, wherein, when the output of the first audio signal is controlled according to an external input, the instructions further cause the processor to:
identify a level of the second audio signal and a level of the third audio signal at a time point at which the output of the first audio signal is controlled; and
store, in the memory, output control information of the first audio signal including the level of the second audio signal and the level of the third audio signal at the time point.

9. The electronic device of claim 8, wherein, when a fourth audio signal is outputted through the speaker, the instructions further cause the processor to:
identify another level of the second audio signal and another level of the third audio signal when the fourth audio signal is outputted; and
control output of the fourth audio signal according to the output control information when the other level of the second audio signal and the other level of the third audio signal correspond to the level of the second audio signal and the level of the third audio signal identified at the time point.

10. The electronic device of claim 1, wherein when the detected volume level of the output of the second audio signal is greater than the second predetermined value, the speaker is determined as presently not worn by the user.

11. A method of processing an audio signal by an electronic device, the method comprising:
outputting a first audio signal through a speaker functionally connected to the electronic device, the speaker including a seal wearable by a user;

while the first audio signal is output through the speaker, receiving a second audio signal through a microphone functionally connected to the electronic device, and identifying whether the second audio signal corresponds to the first audio signal indicating leakage of the first audio signal from the seal; and controlling output of the first audio signal based on the identification, including:
when a detected volume level of an output of the second audio signal is less than a first predetermined value, determining that the speaker is worn normally by the user, and
when the detected volume level of the output of the second audio signal is greater the first predetermined value and less than a second predetermined value due to the leakage, determining that the speaker is worn abnormally by the user.

12. The method of claim 11, further comprising identifying a third audio signal detected by the microphone that is different from the second audio signal.

13. The method of claim 12, further comprising controlling the output of the first audio signal based on a level of the third audio signal.

14. The method of claim 12, further comprising controlling the output of the first audio signal based on a comparison of levels of the second audio signal and the third audio signal.

15. The method of claim 12, further comprising, when a level of the second audio signal is higher than a level of the third audio signal, reducing a level of the first audio signal.

16. The method of claim 15, further comprising outputting vibration data through a motor of the electronic device when the level of the first audio signal is reduced.

17. The method of claim 12, further comprising:
determining a frequency band where a level of the third audio signal is higher than a level of the first audio signal; and
increasing a level of a portion of the first audio signal in the frequency band.

18. The method of claim 12, wherein when the detected volume level of the second audio signal is greater than the second predetermined value, determining that the speaker is presently not worn by the user.

19. The method of claim 12, further comprising, when the output of the first audio signal is controlled according to an external input:
identifying a level of the second audio signal and a level of the third audio signal at a time point at which the output of the first audio signal is controlled; and
storing, in a memory of the electronic device, output control information of the first audio signal including the level volume of the second audio signal and the level of the third audio signal at the time point.

20. The method of claim 19, further comprising, when a fourth audio signal is outputted through the speaker:
identifying another level of the second audio signal and another level of the third audio signal when the fourth audio signal is outputted; and
controlling output of the fourth audio signal according to the output control information when the other level of the second audio signal and the other level of the third audio signal correspond to the level of the second audio signal and the level of the third audio signal identified at the time point.

21. An electronic device comprising:
a speaker located at a first position of the electronic device, the speaker including a seal wearable by a user;
a microphone located at a second position of the electronic device; and
a processor configured to:
output a first audio signal through the speaker;
while the first audio signal is output through the speaker, receive a second audio signal through the microphone and identify whether the second audio signal corresponds to the first audio signal indicating leakage of the first audio signal from the seal; and
control output of the first audio signal based on the identification, including:
when a detected volume level of an output of the second audio signal is less than a first predetermined value, determining that the speaker is worn normally by the user, and
when the detected volume level of the output of the second audio signal is greater the first predetermined value and less than a second predetermined value due to the leakage, determining that the speaker is worn abnormally by the user.

22. The electronic device of claim 21, wherein the speaker including the seal are insertable into an ear canal such that at least a portion of the seal is disposed inside the ear canal, and
when the speaker including the seal is inserted into the ear canal, the microphone remains outside the ear canal.

23. The electronic device of claim 21, wherein the processor is further configured to:
identify a third audio signal detected by the microphone that is different from the second audio signal; and
control the output of the first audio signal based on a level of the third audio signal.

24. The electronic device of claim 23, wherein the processor is further configured to:
compares a level of the second audio signal and a level of the third audio signal; and
when the level of the second audio signal is higher than the level of the third audio signal, reduce a level of the first audio signal.

25. The electronic device of claim 23, wherein the processor is further configured to:
determine a frequency band where a level of the third audio signal is higher than a level of the first audio signal; and
increase a level of a portion of the first audio signal in the frequency band.

26. A non-transitory storage medium of an electronic device storing instructions that, when executed by at least one processor, cause at least one processor of the electronic device to perform operations comprising:
outputting a first audio signal through a speaker functionally connected to the electronic device, the speaker including a seal wearable by a user;
while the first audio signal is output through the speaker, receiving a second audio signal through a microphone functionally connected to the electronic device, and identify whether the second audio signal corresponds to the first audio signal indicating leakage of the first audio signal from the seal;
identifying a third audio signal detected by the microphone that is different from the second audio signal; and
controlling output of the first audio signal based on identifying the second audio signal and the third audio signal, including:

when a detected volume level of an output of the second audio signal is less than a first predetermined value, determining that the speaker is worn normally by the user, and when the detected volume level of the output of the second audio signal is greater the first predetermined value and less than a second predetermined value due to the leakage, determining that the speaker is worn abnormally by the user.

* * * * *